(12) United States Patent
Kawase et al.

(10) Patent No.: US 11,660,982 B2
(45) Date of Patent: May 30, 2023

(54) METHOD OF CONTROLLING FUEL CELL VEHICLE AND THE FUEL CELL VEHICLE

(71) Applicant: HONDA MOTOR CO., LTD., Tokyo (JP)

(72) Inventors: Satoru Kawase, Wako (JP); Toshihiko Kanezaki, Wako (JP); Kentaro Miura, Wako (JP); Kazuo Miyagawa, Wako (JP); Kazuyuki Kadowaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 210 days.

(21) Appl. No.: 17/110,938

(22) Filed: Dec. 3, 2020

(65) Prior Publication Data

US 2021/0170912 A1    Jun. 10, 2021

(30) Foreign Application Priority Data

Dec. 6, 2019 (JP) .............................. JP2019-220817

(51) Int. Cl.
| | |
|---|---|
| B60L 58/40 | (2019.01) |
| B60L 58/32 | (2019.01) |
| H01M 8/04746 | (2016.01) |
| H01M 8/04082 | (2016.01) |
| H01M 8/04119 | (2016.01) |
| H01M 8/04858 | (2016.01) |

(52) U.S. Cl.
CPC ............... *B60L 58/40* (2019.02); *B60L 58/32* (2019.02); *H01M 8/0494* (2013.01); *H01M 8/04126* (2013.01); *H01M 8/04201* (2013.01); *H01M 8/04753* (2013.01); *H01M 2250/20* (2013.01)

(58) Field of Classification Search
CPC ...... H01M 2250/20; B60L 58/40; B60L 58/32
See application file for complete search history.

(56) References Cited

FOREIGN PATENT DOCUMENTS

| | | |
|---|---|---|
| JP | 2004-320946 A | 11/2004 |
| JP | 2006-296106 A | 10/2006 |
| JP | 2009-174700 A | 8/2009 |
| JP | 2011-211770 A | 10/2011 |
| JP | 2016-051585 A | 4/2016 |

OTHER PUBLICATIONS

Yoshida, JP 2006296106A; Espacenet machine translation, 2006 (Year: 2006).*

(Continued)

*Primary Examiner* — Adam A Arciero
(74) *Attorney, Agent, or Firm* — Carrier Shende & Associates, P.C.; Joseph P. Carrier; Jeffrey T. Gedeon

(57) ABSTRACT

In a fuel cell vehicle and a method of controlling the fuel cell vehicle, when a gas pressure in a high pressure tank becomes less than a first threshold pressure, the SOC of an energy storage device is increased to a margin SOC. When the gas pressure becomes a second threshold pressure which is lower than the first threshold pressure, the amount of fuel released from the high pressure tank is limited to prevent the occurrence of buckling, and limit the travel driving force by the motor to a required limit. At the time of limiting the travel driving force, electrical energy of the energy storage device is used to provide assistance in a manner that the travel driving force by the motor becomes the travel driving force of the required limit.

9 Claims, 9 Drawing Sheets

(56) References Cited

OTHER PUBLICATIONS

Iketani, JP 2016-051585, Espacenet machine translation, 2016 (Year: 2016).*
Aritome, JP 2004-320946A, Espacenet machine translation, 2004 (Year: 2004).*
Office Action dated May 10, 2022 issued over the corresponding Japanese Patent Application No. 2019-220817 with the English translation thereof.

* cited by examiner

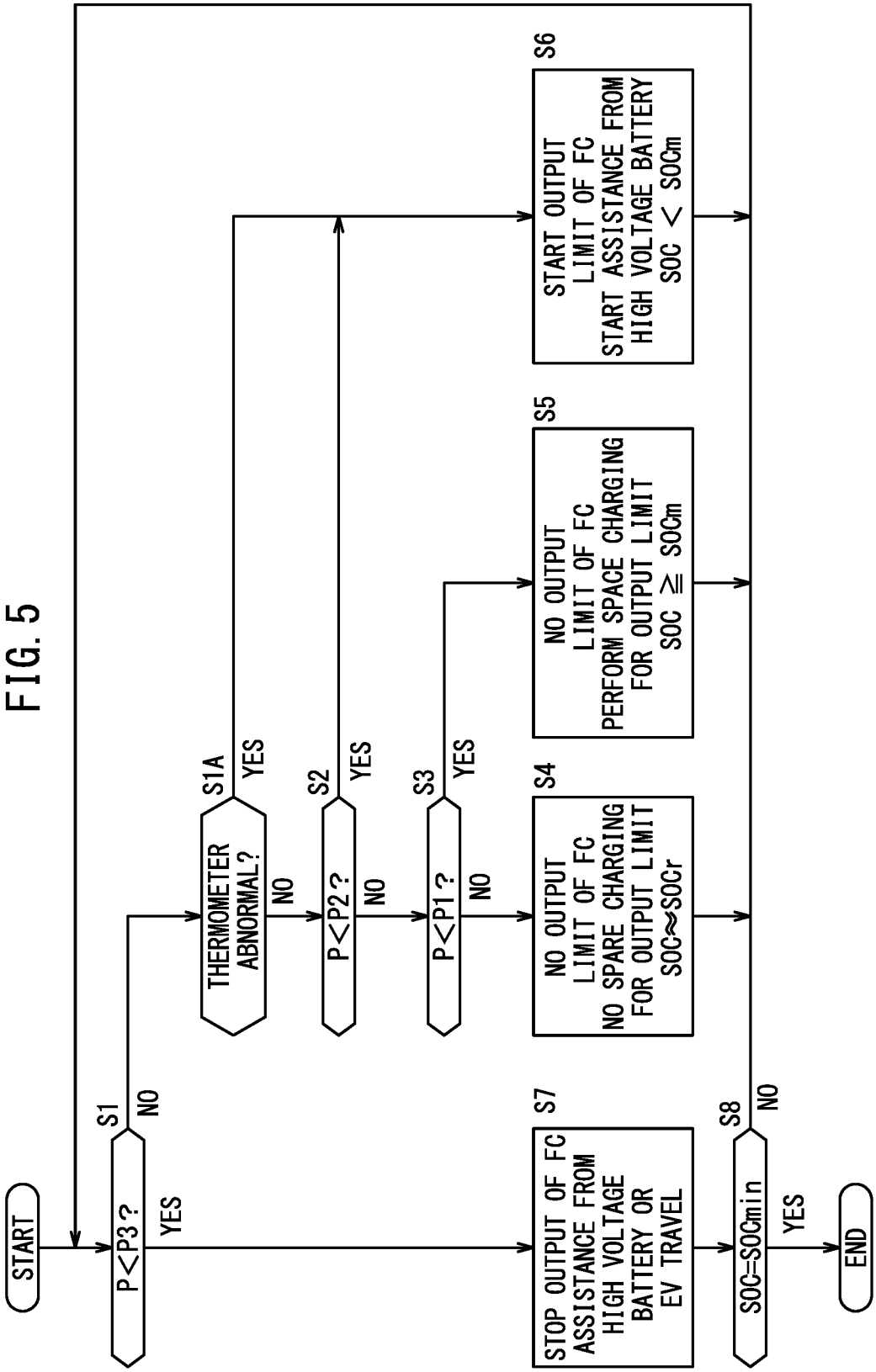

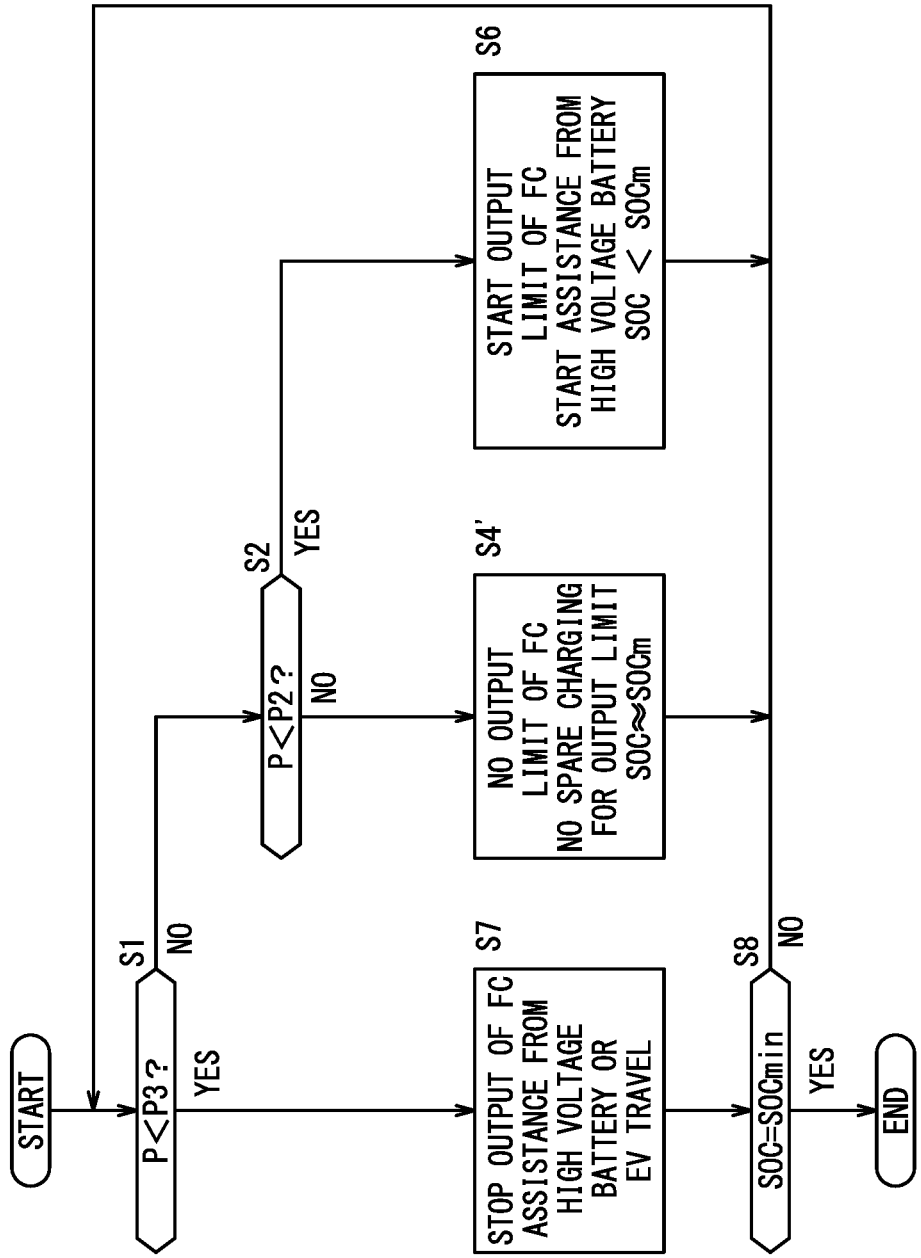

METHOD OF CONTROLLING FUEL CELL VEHICLE AND THE FUEL CELL VEHICLE

CROSS-REFERENCE TO RELATED APPLICATION

This application is based upon and claims the benefit of priority from Japanese Patent Application No. 2019-220817 filed on Dec. 6, 2019, the contents of which are incorporated herein by reference.

BACKGROUND OF THE INVENTION

Field of the Invention

The present invention relates to a method of controlling a fuel cell vehicle equipped with a high pressure tank (hydrogen tank) storing a fuel gas (hydrogen), a fuel cell for performing power generation by electrochemical reactions of the fuel gas and an oxygen-containing gas, a chargeable/dischargeable energy storage device, and a motor configured to generate a travel driving force by at least one of electrical energy of the fuel cell and electrical energy of the energy storage device. Further, the present invention relates to the fuel cell vehicle.

Description of the Related Art

For example, a solid polymer electrolyte fuel cell includes a membrane electrode assembly (MEA) having an anode on one surface of an electrolyte membrane, and a cathode provided on the other surface of the electrolyte membrane. The electrolyte membrane is a polymer ion exchanger membrane. The membrane electrode assembly is sandwiched between separators to form a power generation cell. In general, a predetermined number of power generation cells are stacked together to form, e.g., an in-vehicle fuel cell stack mounted in a fuel cell vehicle (fuel cell electric automobile, etc.).

According to the disclosure of Japanese Laid-Open Patent Publication No. 2011-211770 (hereinafter referred to as JPA2011-211770), in a fuel cell automobile equipped with a high pressure tank containing hydrogen, in the case where there is a rapid acceleration request from a driver, electrical energy supplied from a battery is increased to increase electrical energy supplied to an air compressor. According to a control method disclosed in JPA2011-211770, in this manner, the rapid change in the supply of electrical energy to the motor is prevented, and the decrease in the power performance of the fuel cell automobile is suppressed (paragraphs [0028] and [0075] of JPA2011-211770).

Japanese Laid-Open Patent Publication No. 2009-174700 (hereinafter referred to as JPA2009-174700) discloses a high pressure tank. According to the disclosure, this high pressure tank has a tank body covered with a fiber reinforced resin layer (CFRP layer) around a resin liner, a cap member is attached to the tank body, and a valve is connectable to the cap member. The tank body and the cap member are sealed to form the high pressure tank (paragraph [0002] of JPA2009-174700).

SUMMARY OF THE INVENTION

When a high pressure fuel gas is contained in the gas tank having the resin liner, the fuel gas permeates through the resin liner, and the permeated fuel gas is stored in a space between the resin liner and the CFRP layer (paragraph of JPA2009-174700).

From the state where the permeated fuel gas stagnates (the permeated fuel gas is stored) in the space between the resin liner and the CFRP layer, the internal pressure of the tank is decreased. When the permeated fuel gas pressure becomes higher than the internal tank pressure, there is a concern that so called buckling where the resin liner is deformed inward may occur (paragraph [0005] of JPA2009-174700).

The present invention has been made taking such a problem into consideration, and an object of the present invention is to provide a method of controlling a fuel cell vehicle, and provide the fuel cell vehicle in which it is possible to prevent deformation of a resin liner of a high pressure tank (prevent the occurrence of buckling), and suppress the rapid power decrease of the fuel cell vehicle.

According to an aspect of the present invention, a method of controlling a fuel cell vehicle is provided. The fuel cell vehicle is equipped with a high pressure tank configured to store a fuel gas, a fuel cell configured to perform power generation by electrochemical reactions of the fuel gas and an oxygen-containing gas, a chargeable/dischargeable energy storage device, and a motor configured to generate a travel driving force by at least one of electrical energy of the fuel cell and electrical energy of the energy storage device, and the method includes a gas pressure measuring step of measuring a gas pressure in the high pressure tank, a non-limit travel step of, during a period in which the gas pressure changes from a full charge pressure to an output limit start threshold pressure, allowing the fuel cell vehicle to travel, without limiting the travel driving force by the motor mainly using the electrical energy of the fuel cell, and a limit travel step of, when the gas pressure becomes the output limit start threshold pressure, allowing the fuel cell vehicle to travel while limiting an amount of fuel released from the high pressure tank and limiting the travel driving force by the motor to a required limit, wherein, in the limit travel step, assistance is provided using the electrical energy of the energy storage device in a manner that the travel driving force by the motor becomes the travel driving force of the required limit.

According to another aspect of the present invention, a method of controlling a fuel cell vehicle is provided. The fuel cell vehicle is equipped with a high pressure tank configured to store a fuel gas, a fuel cell configured to perform power generation by electrochemical reactions of the fuel gas and an oxygen-containing gas, a chargeable/dischargeable energy storage device, and a motor configured to generate a travel driving force by at least one of electrical energy of the fuel cell and electrical energy of the energy storage device, and the method includes a gas pressure measuring step of measuring a gas pressure in the high pressure tank, a non-limit travel step of, during a period in which the gas pressure changes from a full charge pressure to a first threshold pressure, allowing the fuel cell vehicle to travel without limiting the travel driving force by the motor mainly using the electrical energy of the fuel cell, an SOC increase travel step of, when the gas pressure becomes less than the first threshold pressure, extra charging a partial amount of electrical energy generated in power generation of the fuel cell, in the energy storage device to increase the SOC of the energy storage device up to a margin SOC, and a limit travel step of, when the gas pressure becomes a second threshold pressure which is less than the first threshold pressure, allowing the fuel cell vehicle to travel while limiting an amount of fuel released from the high pressure tank and limiting the travel driving force by the motor to a required limit, wherein, in the limit travel step, assistance is provided using the electrical energy of the energy storage device in a manner that the travel driving force by the motor becomes the travel driving force of the required limit.

According to still another aspect of the present invention, a method of controlling a fuel cell vehicle is provided. The fuel cell vehicle is equipped with a high pressure tank configured to store a fuel gas, a fuel cell configured to perform power generation by electrochemical reactions of the fuel gas and an oxygen-containing gas, a chargeable/dischargeable energy storage device, a motor configured to generate a travel driving force by at least one of electrical energy of the fuel cell and electrical energy of the energy storage device, a temperature measuring unit configured to measure a gas temperature in the high pressure tank, and a gas pressure measuring unit configured to measure a gas pressure in the high pressure tank, and the method includes a temperature measuring unit monitoring step of detecting presence/absence of abnormality in the temperature measuring unit configured to measure the gas temperature in the high pressure tank, and a limit travel step of, when there is abnormality in the temperature measuring unit, allowing the fuel cell vehicle to travel while limiting an amount of the fuel released from the high pressure tank and limiting the travel driving force by the motor to a required limit, wherein, in the limit travel step, assistance is provided using the electrical energy of the energy storage device in a manner that the travel driving force by the motor becomes the travel driving force of the required limit.

According to still another aspect of the present invention, a method of controlling a fuel cell vehicle is provided. The fuel cell vehicle is equipped with a high pressure tank configured to store a fuel gas, a fuel cell configured to perform power generation by electrochemical reactions of the fuel gas and an oxygen-containing gas, a chargeable/dischargeable energy storage device, and a motor configured to generate a travel driving force by at least one of electrical energy of the fuel cell and electrical energy of the energy storage device, and the method includes a gas temperature/gas pressure measuring step of measuring a gas temperature and a gas pressure in the high pressure tank, an SOC increase travel step of, when the gas temperature becomes less than a first threshold temperature, charging a partial amount of electrical energy generated in power generation by the fuel cell, in the energy storage device to increase an SOC of the energy storage device up to a margin SOC, a non-limit travel step of, until the gas temperature becomes a second threshold temperature which is lower than the first threshold temperature, allowing the fuel cell vehicle to travel mainly using the electrical energy of the fuel cell without limiting the travel driving force by the motor, and a limit travel step of, when the gas temperature becomes the second threshold temperature, allowing the fuel cell vehicle to travel while limiting an amount of fuel released from the high pressure tank, and limiting the travel driving force by the motor to a required limit, wherein, in the limit travel step, assistance is provided using the electrical energy of the energy storage device in a manner that the travel driving force by the motor becomes the travel driving force of the required limit.

According to still another aspect of the present invention, a fuel cell vehicle is provided and includes a high pressure tank configured to store a fuel gas, a fuel cell configured to perform power generation by electrochemical reactions of the fuel gas and an oxygen-containing gas, a chargeable/dischargeable energy storage device, a motor configured to generate a travel driving force by at least one of electrical energy of the fuel cell and electrical energy of the energy storage device, a control device, a gas pressure measuring unit configured to measure a gas pressure in the high pressure tank, a non-limit travel control unit configured to, during a period in which the gas pressure changes from a full charge pressure to an output limit start threshold pressure, allow the fuel cell vehicle to travel, without limiting the travel driving force by the motor mainly using the electrical energy of the fuel cell, and a limit travel control unit configured to, when the gas pressure becomes the output limit start threshold pressure, allow the fuel cell vehicle to travel while limiting an amount of fuel released from the high pressure tank and limiting the travel driving force by the motor to a required limit, wherein the limit travel control unit is configured to provide assistance using the electrical energy of the energy storage device in a manner that the travel driving force by the motor becomes the travel driving force of the required limit.

In the present invention, it is possible to prevent deformation of a resin liner of a high pressure tank storing the fuel gas (prevent the occurrence of buckling), and suppress the rapid power decrease of the fuel cell vehicle.

Then, when the condition where the amount of hydrogen supplied from the high pressure tank is suppressed occurs, since the energy storage device is used as assistance to provide electrical energy for the shortage of electrical energy which is required for maintaining the commodity quality of the vehicle, it is possible to maintain the required minimum commodity quality.

Further, in the case where the pressure of the high pressure tank becomes low, in preparation for the limit of the amount of supplying hydrogen at low pressure, if the control to generate extra electrical energy and charge the extra electrical energy in the energy storage device in advance is implemented, it is possible to store the predetermined amount of electrical energy at the time of starting the low pressure output limit of the high pressure tank.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 5 is a flow chart used for explaining a method of controlling a fuel cell vehicle according to a first modified embodiment;

FIG. 9 is a flow chart used for explaining a method of controlling a fuel cell vehicle according to a fourth modified embodiment.

DESCRIPTION OF THE PREFERRED EMBODIMENTS

Hereinafter, embodiments of a method of controlling a fuel cell vehicle, and the fuel cell vehicle according to the present invention will be described in detail with reference to the accompanying drawings.

[Structure]

Figure 1:
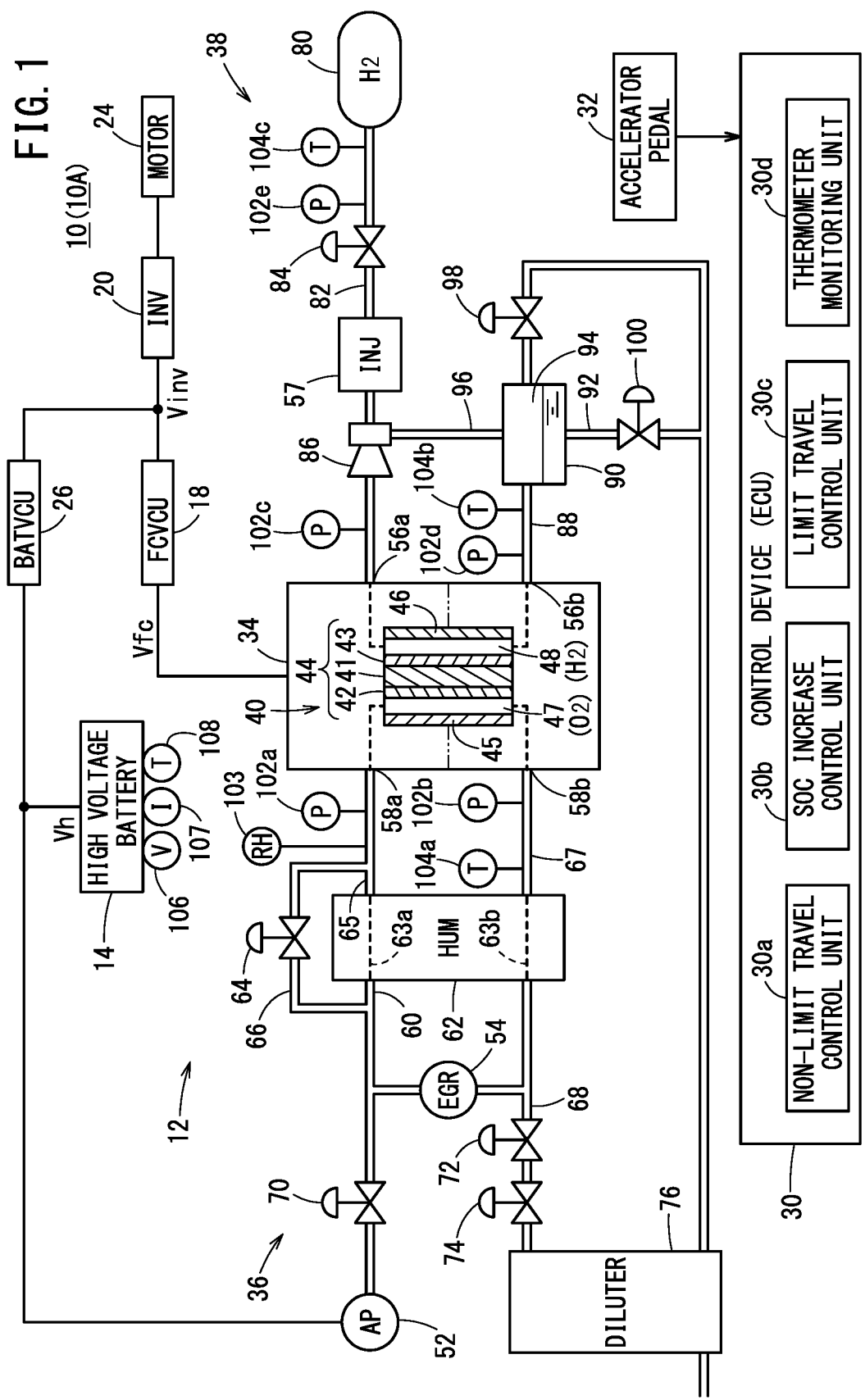
FIG. 1 is a diagram showing an example of structure of a fuel cell vehicle according to an embodiment, for performing a method of controlling the fuel cell vehicle according to the embodiment.

FIG. 1 is a block diagram schematically showing an example of structure of a fuel cell vehicle (user's own vehicle) 10 according to an embodiment for performing a method of controlling the fuel cell vehicle according to the embodiment.

As shown in FIG. 1, for example, the fuel cell vehicle 10 is a fuel cell automobile.

The fuel cell vehicle 10 includes, in addition to a fuel cell system 12, a high voltage battery (energy storage device) 14 for generating high voltage Vh of about several hundred volts, a step-up converter (FCVCU: fuel cell voltage control unit) 18, an inverter (drive device of a rotary electric motor) 20, a motor (rotary electric motor for driving the vehicle) 24, a step-up/step-down (bidirectional) converter (BATVCU: battery voltage control unit) 26, a control device (ECU) 30, and an accelerator pedal (acceleration device) 32.

The control device 30 is made up of the ECU (electronic control unit). The control device 30 incudes a CPU which executes a program stored in a memory to operate as a various function control unit, etc., and performs overall control of each constituent element of the fuel cell vehicle 10 including the fuel cell system 12 through control lines (including wireless lines).

In the embodiment of the present invention, the control device 30 functions as a non-limit travel control unit 30a, a SOC increase control unit 30b, a limit travel control unit 30c, and a thermometer monitoring unit 30d, etc.

The fuel cell system 12 includes a fuel cell stack (fuel cell) 34, an oxygen-containing gas supply apparatus 36 and a fuel gas supply apparatus 38.

The oxygen-containing gas supply apparatus 36 supplies an oxygen-containing gas (air) to the fuel cell stack 34, and the fuel gas supply apparatus 38 supplies the fuel gas (hydrogen) to the fuel cell stack 34.

The fuel cell stack 34 is formed by stacking a plurality of power generation cells 40. Each of the power generation cells 40 includes a membrane electrode assembly 44, and separators 45, 46 sandwiching the membrane electrode assembly 44.

The membrane electrode assembly 44 includes a solid polymer electrolyte membrane 41 and a cathode 42, and an anode 43 holding the solid polymer electrolyte membrane 41. For example, the sold polymer electrolyte membrane is a thin membrane of perfluorosulfonic acid containing water.

Each of the cathode 42 and the anode 43 includes a gas diffusion layer (not shown) such as a carbon paper. An electrode catalyst layer (not shown) is formed by porous carbon particles deposited uniformly on the surface of the gas diffusion layer and platinum alloy supported on the surfaces of the porous carbon particles. An electrolyte electrode layer is formed on each of both surfaces of the solid polymer electrolyte membrane 41.

A cathode flow field (oxygen-containing gas flow field) 47 is formed on a surface of one of the separators 45 facing the membrane electrode assembly 44. The cathode flow field 47 connects an oxygen-containing gas inlet connection port 58a and an oxygen-containing gas outlet connection port 58b.

An anode flow field (fuel gas flow field) 48 is formed on a surface of the other separator 46 facing the membrane electrode assembly 44. The anode flow field (fuel gas flow field) connects a fuel gas inlet connection port 56a and a fuel gas outlet connection port 56b.

The output of the stacked power generation cells 40, i.e., the output of the fuel cell stack 34 (power generation electrical energy of the power generation voltage Vfc at high voltage) is supplied to the motor 24 through the step-up converter 18 and the inverter 20 under control of the control device 30, and can be charged in the high voltage battery 14 through the step-up converter 18 and the voltage step-up/step-down converter (which functions as a voltage step-down converter) 26.

Further, the output of the fuel cell stack 34 (power generation electrical energy of the power generation voltage Vfc) can be charged in a low voltage battery (not shown) through the step-up converter 18, the step-up/step-down converter (which functions as a step-down converter) 26, and a step-down converter (not shown).

The electrical energy of the high voltage Vh of the high voltage battery 14 is capable of driving the motor 24 at the time of the start-up time (at the time of starting operation) through the step-up/step-down converter (which functions as a step/up converter) 26, and the inverter 20 when a power supply switch (not shown) of the fuel cell vehicle 10 is switched from the OFF state to the ON state. Drive wheels (not shown) are driven by a traveling drive force by a travel driving force applied to the motor 24 to start travel of the fuel cell vehicle 10.

Further, during travel where the power generation electrical energy of the power generation voltage Vfc at high voltage of the fuel cell stack 34 is used to drive the motor 24 through the step-up converter 18 and the inverter 20, in the case where acceleration control operation of an accelerator pedal 32 (acceleration control operation) is performed, the electrical energy of the high voltage Vh of the high voltage battery 14 is supplied to the motor 24 through the step-up/step-down converter (which functions as a step-up converter) 26 and the inverter 20 to assist the power generation electrical energy of the fuel cell stack 34.

In this manner, the electrical energy of the drive end voltage Vinv of the inverter 20 is provided by the electrical energy obtained by voltage conversion of at least one of the electrical energy by the power generation voltage Vfc of the fuel cell stack 34 and the electrical energy by the high voltage Vh of the high voltage battery 14 by the step-up converter 18 and the step-up/step-down converter 26.

In practice, at the time of acceleration by control operation of the accelerator pedal 32, the drive end voltage Vinv on the input side of the inverter 20 is the high voltage, and the traveling drive force of the motor 24 is increased.

The regenerative electrical energy of the motor 24 generated at the time of deceleration of the fuel cell vehicle 10 is charged (accumulated) in the high voltage battery 14 through the inverter 20 and the step-up/step-down converter (which functions as a step-down converter) 26.

The electrical energy of the high voltage Vh of the high voltage battery 14 can drive an air pump (AP, air compressor) 52.

The electrical energy at low voltage of a low voltage battery (not shown) is supplied to a discharge recirculation pump (EGR pump) 54, an injector 57 which functions as a pressure reducing valve, the control device 30, and various solenoid valves, and additionally, an air conditioner (not shown), etc.

The fuel cell stack 34 has the fuel gas inlet connection port 56a for supplying a fuel gas (e.g., hydrogen gas) to an anode 43 through the anode flow field 48, and the fuel gas outlet connection port 56b.

The fuel cell stack 34 is provided with the oxygen-containing gas inlet connection port 58a for supplying an oxygen-containing gas (e.g., the air) to the cathode 42 through the cathode flow field 47, and the oxygen-containing gas outlet connection port 58b.

It should be noted that the fuel cell stack 34 is provided with a coolant inlet connection port (not shown) and a coolant outlet connection port for allowing a coolant (not shown) to flow in each of the power generation cells 40.

An oxygen-containing gas supply channel 60 of the oxygen-containing gas supply apparatus 36 is provided with the air pump 52 for sucking the air from the atmospheric air, and compressing the air to supply the compressed air as an oxygen-containing gas to the fuel cell stack 34.

The oxygen-containing gas supply channel 60 is provided with a humidifier (HUM) 62 and a bypass channel 66 for bypassing the humidifier 62 through a bypass valve 64.

The oxygen-containing gas supply channel 60 is connected to the oxygen-containing gas inlet connection port 58a of the fuel cell stack 34 through the humidifier 62 and an oxygen-containing gas supply channel 65.

An oxygen-containing exhaust gas discharge channel 68 is connected to the oxygen-containing gas outlet connection port 58b through an oxygen-containing exhaust gas discharge channel 67 and the humidifier 62. An EGR pump 54 is provided between the oxygen-containing exhaust gas discharge channel 68 and the oxygen-containing gas supply channel 60.

At the time of stopping the fuel cell vehicle 10 (fuel cell system 12) (at the time of switching off a power supply switch (not shown)), the EGR pump 54 circulates some of the oxygen-containing exhaust gas (cathode off gas) which is a gas discharged from the oxygen-containing gas outlet connection port 58b back to the oxygen-containing gas inlet connection port 58a.

The oxygen-containing gas supply channel 60 of the air pump 52 is provided with an inlet seal valve 70.

The oxygen-containing exhaust gas discharge channel 68 is provided with an outlet seal valve 72, and a diluter 76 is connected to the downstream side of the outlet seal valve 72 through the back pressure control valve 74.

The fuel gas supply apparatus 38 includes a high pressure hydrogen tank for storing high pressure hydrogen (pressure accumulator, hereinafter also referred to as the high pressure tank) 80, and the high pressure tank 80 is connected to the fuel gas inlet connection port 56a of the fuel cell stack 34 through a fuel gas supply channel 82. The fuel gas supply channel 82 is provided with an interruption valve 84, a pressure regulating injector 57, and an ejector 86 arranged successively in the flow direction of the hydrogen gas.

A fuel exhaust gas channel 88 is connected to a fuel gas outlet connection port 56b of the fuel cell stack 34. The fuel exhaust gas channel 88 is connected to a gas liquid separator 90, and the gas liquid separator 90 is provided with a drain channel 92 for discharging the liquid component and a gas channel 94 for discharging the gas component. The gas channel 94 is connected to the ejector 86 through a circulation channel 96, and connected to the diluter 76 under opening operation of a purge valve 98. A drain channel 92 is connected to the diluter 76 through a drain valve 100.

The diluter 76 has a function of mixing a fuel exhaust gas discharged from the fuel gas outlet connection port 56b of the fuel cell stack 34 (anode off gas containing the hydrogen gas), and an oxygen-containing exhaust gas discharged from the oxygen-containing gas outlet connection port 58b of the fuel cell stack 34 (cathode off gas containing the oxygen) to dilute the hydrogen concentration to not more than a predetermined value.

Pressure gauges 102a, 102b, 102c, 102d, and 102e are disposed on the outlet side of the oxygen-containing gas supply channel 65, the oxygen-containing exhaust gas discharge channel 67, the fuel gas supply channel 82, the fuel exhaust gas channel 88, and the high pressure tank 80, respectively. A hygrometer 103 is disposed in the oxygen-containing gas supply channel 65. Thermometers 104a, 104b, 104c are disposed on the outlet side of the oxygen-containing exhaust gas discharge channel 67, the fuel exhaust gas channel 88, and the high pressure hydrogen tank 80, respectively.

The high voltage battery 14 is provided with a voltmeter 106, an ammeter 107, and a thermometer 108. An electric circuit including the step-up converter 18, the step-up/step-down converter 26, and the inverter 20 is provided with voltmeters, ammeters, and thermometers (not shown).

[Normal Operation of the Fuel Cell Vehicle 10 at the Time of Normal Travel (Non-Limit Travel)]

Operation at the time of normal traveling (non-limit travel) of the fuel cell vehicle 10 basically having the above structure will be described below with reference to FIG. 2 where the flows of the fuel gas, the oxygen-containing gas, and electrical energy in the fuel cell system 12 are indicated by arrows.

Figure 2:
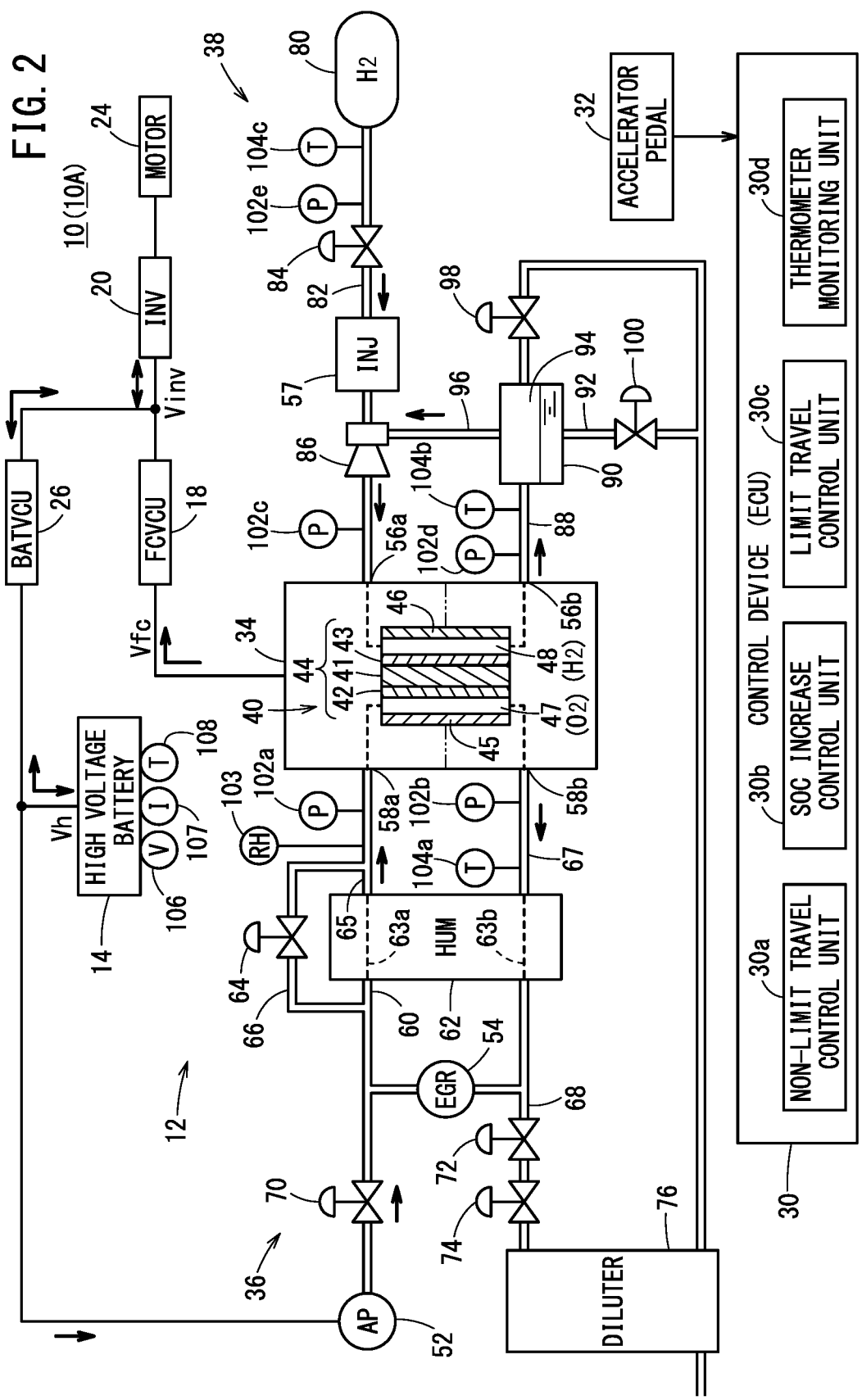
FIG. 2 is a diagram showing the method of controlling the fuel cell vehicle, and operation of the fuel cell vehicle shown in FIG. 1.

In FIG. 2, during normal travel (non-limit travel (non-limit travel where the vehicle velocity [km/h] is not limited), the oxygen-containing gas (air) is supplied from the air pump 52 operated using the electrical energy of high voltage Vh, to the oxygen-containing gas supply channel 60. After the oxygen-containing gas flows through the humidifier 62 and the oxygen-containing gas is humidified, or, after the oxygen-containing gas flows through the bypass channel 66 to bypass the humidifier 62, the oxygen-containing gas is supplied to the oxygen-containing gas inlet connection port 58a of the fuel cell stack 34.

It should be noted that the humidifier 62 includes a channel 63a where the oxygen-containing gas (dried air) flows and a channel 63b where an exhaust gas (humidified oxygen-containing exhaust gas, cathode off gas) from the oxygen-containing gas outlet connection port 58b of the fuel cell stack 34 flows through oxygen-containing gas outlet connection port 58b and the oxygen-containing exhaust gas discharge channel 67 of the fuel cell stack 34, and has a function of humidifying the oxygen-containing gas supplied from the air pump 52. That is, the humidifier 62 moves water in the cathode off gas to the supplied gas (oxygen-containing gas) through a porous membrane.

The degree of humidification at this time is determined to reach a humidification amount where the solid polymer electrolyte membrane 41 is humidified, and the desired power generation performance is achieved in the fuel cell stack 34. The humidification amount is determined by the opening degree control of the bypass valve 64 by the control device 30 with reference to data of the hygrometer 103.

On the other hand, in the fuel gas supply apparatus 38, under opening operation of the injector 57, the hydrogen gas (fuel gas) is supplied from the high pressure hydrogen tank 80 to the fuel gas supply channel 82. The hydrogen gas flows through the ejector 86, and thereafter, the hydrogen gas is supplied to the fuel gas inlet connection port 56a of the fuel cell stack 34.

In the fuel cell stack 34, the oxygen-containing gas is supplied from the oxygen-containing gas inlet connection port 58a to the cathode 42 through the cathode flow field 47 of each of the power generation cells 40. In the meanwhile, the hydrogen gas is supplied from the fuel gas inlet connection port 56a to the anode 43 through the anode flow field 48 of each of the power generation cells 40. Therefore, in each of the power generation cells 40, the air supplied to the cathode 42 and the hydrogen gas supplied to the anode 43 is partially consumed in electrochemical reactions in the electrode catalyst layers to perform power generation.

It should be noted that the power generation amount of the fuel cell stack 34 can be controlled by controlling the increase and decrease of the rotation number of the air pump 52 to control the mass flow rate of the oxygen-containing gas supplied to the oxygen-containing gas inlet connection port 58a. Further, the power generation amount of the fuel cell stack 34 can be controlled by controlling the increase and decrease of the ON duty of the injector 57 to control the mass flow rate of the fuel gas supplied to the fuel gas inlet connection port 56a.

Then, the cathode off gas which is the air supplied to, and partially consumed at the cathode 42, and the water produced in the reaction is discharged into the oxygen-containing gas outlet connection port 58b, and flows through the oxygen-containing exhaust gas discharge channel 68 into the diluter 76. Likewise, the hydrogen gas supplied to, and partially consumed at the anode 43 is discharged as the anode off gas (after some of the fuel gas has been consumed) into the fuel gas outlet connection port 56b. After the anode off gas flows from the fuel exhaust gas channel 88 into the gas liquid separator 90 to remove the liquid water, the anode off gas is sucked from the gas channel 94 into the ejector 86 through the circulation channel 96.

The electric energy of the power generation voltage Vfc of high voltage generated in power generation of the fuel cell stack 34 formed by connecting a plurality of power generation cells 40 electrically together in series is converted into the electric energy of the drive end voltage Vinv of the higher voltage to obtain the required drive torque of the motor 24 through the step-up voltage converter 18, and supplied to the input side of the inverter 20.

The duty of the inverter 20 is controlled based on the opening degree of the accelerator pedal 32 (accelerator pedal opening degree) to drive the motor 24 by three-phase PWM driving. Rotation of drive wheels (not shown) is driven by the motor 24 to enable travel of the fuel cell vehicle 10.

In the case where there is extra electrical energy of the power generation voltage Vfc generated in power generation of the fuel cell stack 34, the extra electric energy is charged in the high voltage battery 14 of the high voltage Vh through the step-up/step-down converter 26, and the electrical energy of high voltage is converted into electrical energy of low voltage through a step-down converter (not shown), and then, charged in a low voltage battery (not shown).

The electrical energy of high voltage Vh of the high voltage battery 14 is supplied to the air pump 52. The electric energy of low voltage of the low voltage battery (not shown) is supplied to the control device 30, the EGR pump 54, the injector 57, and an air conditioner (not shown), etc.

The SOC of the high voltage battery 14 (state of charge, i.e., the SOC indicates the amount of charged electrical energy where 0[%] indicates "empty", and 100[%] indicates "full") is calculated by the control device 30 based on the voltage detected by the voltmeter 106, the electric current detected by the ammeter 107, and the temperature detected by the thermometer 108, with reference to a map (not shown).

During the normal travel (non-limit travel), the non-limit travel control unit 30a performs charge/discharge control by setting the SOC of the high voltage battery 14 to a charge amount (hereinafter referred to as the required SOCr) which is smaller than the charge amount (hereinafter referred to as the margin SOCm) close to the fully charged state, and has a constant value where the entire regenerative electrical energy of the motor 24 can be stored.

Basically, the non-limit travel control unit 30a permits travel at the maximum velocity (Vmax) where the accelerator pedal 32 of the fuel cell vehicle 10 is fully depressed (maximum acceleration opening degree). In the case where it is detected that the accelerator pedal 32 has been depressed rapidly, or it is detected that the accelerator pedal 32 has been fully depressed, the non-limit travel control unit 30a assists electrical energy of the fuel cell stack 34 by using the electrical energy of the high voltage battery 14, and drives the motor 24 through the inverter 20.

The normal operation of the fuel cell vehicle 10 during normal travel (non-limit travel) has been described above.

[Operation which Improves the Commodity Quality where Rapid Power Decrease of the Fuel Cell Vehicle 10 is Suppressed]

Figure 3:
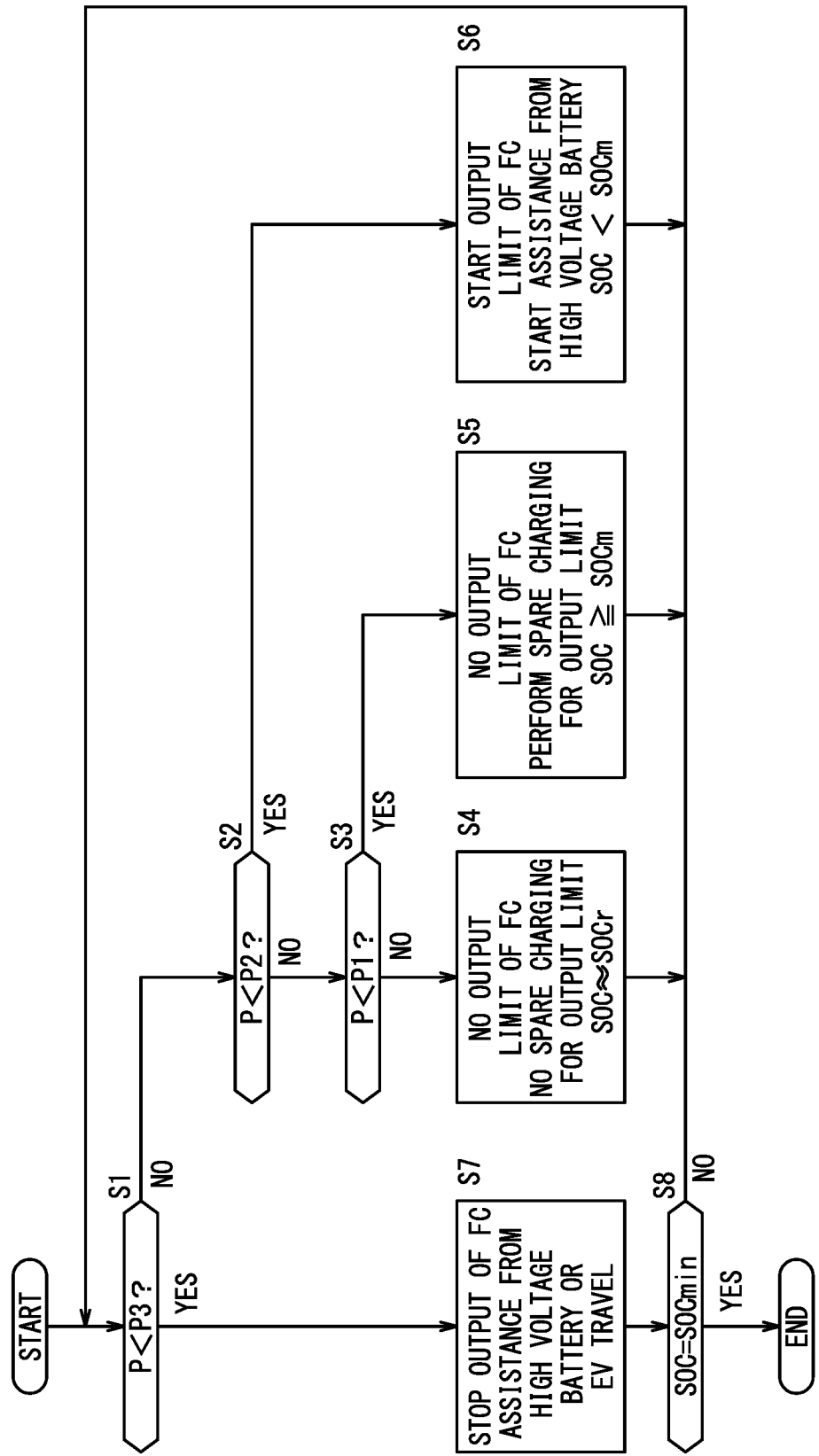
FIG. 3 is a flow chart used for explaining operation of the embodiment.

Next, the method of controlling the fuel cell vehicle according to main part of the present invention will be described based on the operation of the fuel cell vehicle 10 equipped with the fuel cell system 12 for performing the control method with reference to a flow chart in FIG. 3 and a timing chart in FIG. 4. A program according to the flow chart FIG. 3 is mainly performed by (the CPU of) the control device 30. In the following description, for the purpose of brevity, the "control device 30" as the subject of operation will not be mentioned each time, and will be omitted as necessary.

Figure 4:
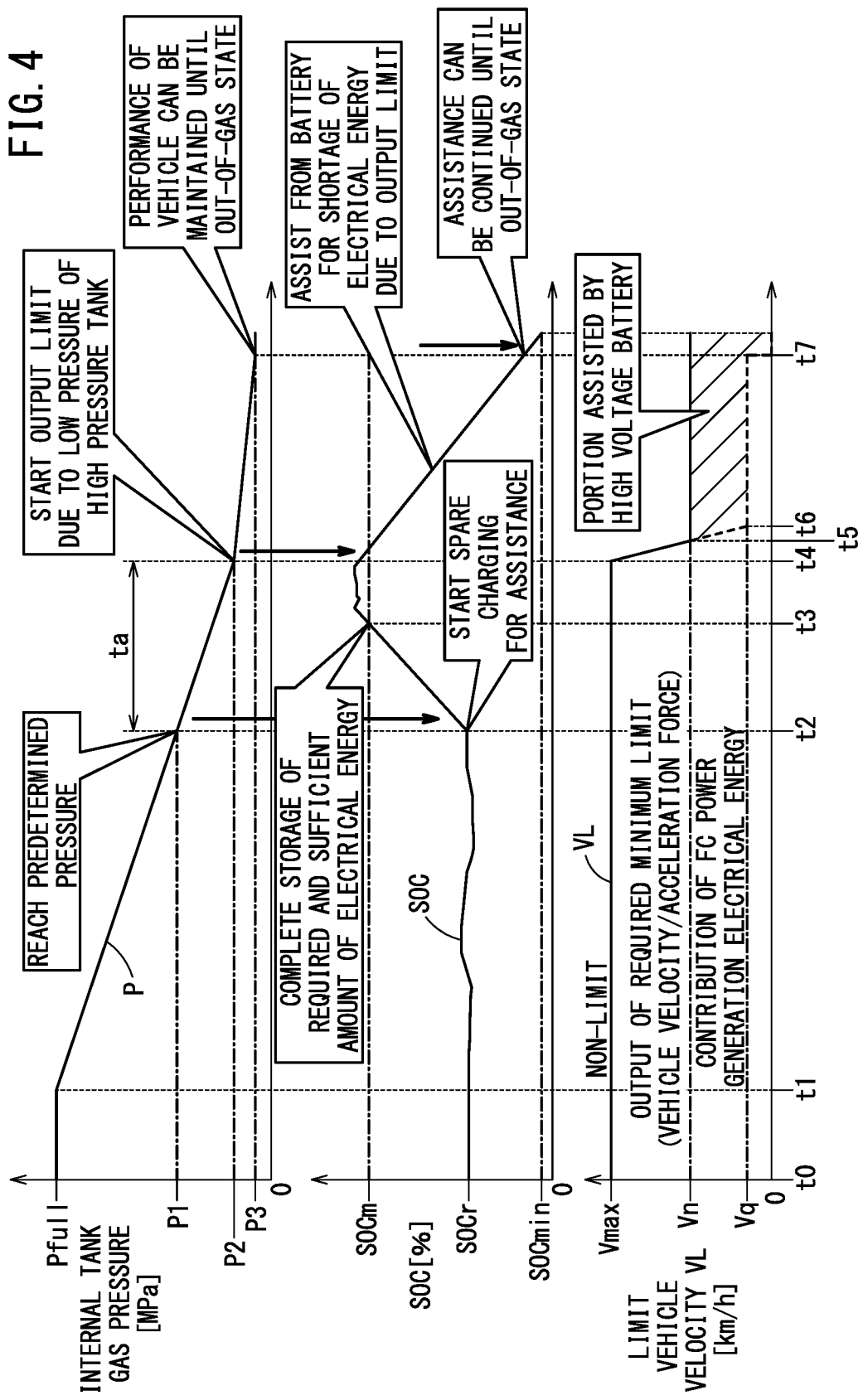
FIG. 4 is a timing chart used for explaining operation of the embodiment.

In the timing chart of FIG. 4, the chart on the lower stage shows the limit vehicle velocity VL [km/h], and defines the maximum vehicle velocity Vmax at which the vehicle velocity is not limited, and the limit velocity Vn at which the vehicle velocity is limited. The limit vehicle velocity Vn herein means the minimum required output (vehicle velocity/acceleration force) of the motor 24 for maintaining the commodity quality while maintaining the minimum performance required for the vehicle.

The limit vehicle velocity Vn may be set to a velocity maintaining the vehicle velocity in correspondence with road surface conditions (dry, wet, concrete, asphalt, soil ground, etc.).

The chart on the middle stage shows the SOC as a charge amount (charging state) of the high voltage battery 14, and defines the margin SOCm and the above described required SOCr (charge amount which is smaller than the margin SOCm close to the fully charged state, and has a constant value where the entire regenerative electrical energy of the motor 24 can be stored).

The chart on the upper stage shows the gas pressure P [MPa] in the high pressure tank 80 measure by the pressure gauge 102e, and defines the full charge pressure Pfull, a first threshold pressure (spare charging start threshold pressure) P1 for starting spare charging, a second threshold pressure (output limit start threshold pressure) P2 to start limiting the output (power generation) by the fuel cell stack 34 by decreasing (limiting) the release rate of the fuel gas from the high pressure tank 80, and a third threshold pressure (out-of-gas tank pressure) P3 at which the fuel gas is regarded as having a zero value.

More specifically, the first threshold value P1 (also described as the predetermined pressure in FIG. 4) is a threshold pressure at which the SOC as the charge amount of the high voltage battery 14 is increased from the required SOCr to a value above the margin SOCm, and spare charging (extra charging) is started in preparation for providing assistance for the power generation output of the fuel cell stack 34 by the high voltage battery 14.

The second threshold pressure P2 is a threshold pressure for preventing deformation due to the occurrence of buckling of the resin liner of the high pressure tank 80 by decreasing the gas pressure P of the high pressure tank 80 in a manner to achieve the speed at which the permeation gas stored in the space between the resin liner and the CFRP layer is released to the outside from a cap portion, and start the output limit of the fuel amount (fuel gas release amount) by reducing the change of the fuel gas pressure released from the high pressure tank 80 to the fuel cell stack 34 over time.

It is adequate to reduce the mass flow rate to a predetermined mass flow rate by reducing the ON duty of the injector 57 in order to decrease the pressure of the fuel gas released from high pressure tank 80 to the fuel cell stack 34 over time.

The third threshold pressure P3 is a threshold pressure which is the minimum tank protection pressure at which it is possible to prevent the occurrence of buckling, and the high pressure tank 80 is regarded as, so called in the out-of-gas state.

In step S1 of a flow chart in FIG. 3, it is determined whether or not the gas pressure P measured by the pressure gauge 102*e* is lower than the minimum third threshold pressure P3.

At the time point where the fuel cell vehicle 10 started traveling under the state where the gas pressure P of the high pressure tank 80 is the full charge pressure Pfull (travel start time point) t1, the condition of this determination is not satisfied (step S1: NO, P P3).

Then, in step S2 during traveling, it is determined whether or not the gas pressure P is lower than the second threshold pressure P2. However, also in this determination, at the travel start time point t1 under the full charge pressure Pfull, the condition of this determination is not satisfied (step S2: NO, P P2).

Further, in step S3 during traveling, it is determined whether or not the gas pressure P is lower than the first threshold pressure P1. However, also in this determination, at the travel start time point t1 under the full charge pressure Pfull, the condition of this determination is not satisfied (step S3: NO, P≥P1).

Since the gas pressure P in the high pressure tank 80 is not lower than the threshold pressure P1 (P≥P1), in step S4, without limiting the pressure reducing rate of the gas pressure P {the reduction ratio of the gas pressure P per unit time=(minute gas pressure/minute time) ($\Delta P/\Delta t$)} in the fuel cell stack 34 (shown as FC in FIGS. 3 and 4), namely, without limiting the output of the fuel cell stack 34, and without performing spare charging, by control operation of the accelerator pedal 32, it is possible to allow the fuel cell vehicle 10 to continue and reliably travel where it is it is possible to increase the limit vehicle velocity VL to the maximum vehicle velocity Vmax.

In this step S4 (between the time point t1 and the time point t2), the charge/discharge control of maintaining the SOC of the high voltage battery 14 at substantially the required SOCr (SOC≈SOCr) is performed. That is, during the process in step S4 (between the time point t1 and the time point t2), in the case where SOC≥SOCr, the power generation electrical energy of the fuel cell stack 34 is decreased to consume extra electrical energy of the high voltage battery 14, and in the case where SOC<SOCr, the power generation electrical energy of the fuel cell stack 34 is increased to charge the high voltage battery 14.

In this manner, during the period between the time point t1 and the time point t2, the limit vehicle speed VL is set to the maximum vehicle velocity Vmax where the vehicle velocity is not limited.

After the process in step S4, the process from step S1 is performed repeatedly for a short period of time (S1: NO→S2: NO→S3: NO→S4→S1: NO . . . ), and the gas pressure P [MPa] in the high pressure tank 80 measured by the pressure gauge 102*e* is decreased, and at the time point t2 during the travel, the gas pressure P reaches the first threshold pressure P1 and the condition of the determination in step S3 (P<P1) is satisfied (step S3: YES). From the time point t2 when the condition of determination in step S3 is satisfied, the control is switched from the process in step S4, and the process in step S5 is performed.

In the process in step S5, spare charging is started in preparation for travel where electrical energy of the high voltage battery 14 is used for providing assistance for power generation electrical energy of the fuel cell 34 from the time point t3 (target SOC SOCm). In spare charging in step S5, during the travel, the pressure reducing rate of the gas pressure P in the fuel cell stack 34 is not limited, and the output of the fuel cell stack 34 is not limited as well (VL=Vmax).

In step S5, the SOC increase control unit 30*b* performs spare charging by increasing the power generation electrical energy (power generation amount) in a manner that the SOC becomes slightly higher than the margin SOCm (SOC SOCm) within a predetermined time period ta to charge the electrical energy in the high voltage battery 14, or by increasing the power generation electrical energy (power generation amount) to charge an extra portion of the power generation electrical energy (power generation amount) in the high voltage battery 14 or charging an extra portion of the power generation electrical energy (power generation amount) in the high voltage battery 14 without increasing the power generation electrical energy.

In this case, the margin SOCm and the spare charging speed ($\Delta SOC/\Delta ta$=unit SOC/unit time) as a target value may be determined in correspondence with the state (the gas temperature T and the gas pressure P) of the high pressure tank 80, to perform power generation control of the fuel cell stack 34.

In FIG. 4, in the case where the gas pressure P is decreased under the unlimited pressure rate, the time period ta (period between the time point t2 and the time point t4 in FIG. 4) is determined to the time period until the gas pressure P is decreased to the second threshold value P2.

In the embodiment of the present invention, in the period between the time point t2 and the time point t3 during the travel ta), a required and sufficient amount of electrical energy for providing assistance from the time point t4 is charged (stored) in the high voltage battery 14 to complete spare charging in step S5 (S3: YES→S5→S1: NO→S2: NO→S3: YES→S5→ . . . ).

At the time point t4 during travel after spare charging completion, the condition of the determination in step S2 is satisfied (S2: YES, P<P2).

Thereafter, in step S6, the limit travel control unit 30c starts limiting the output of the fuel cell stack 34, and assists the limited portion of the output, by the output of the high voltage battery 14.

Therefore, from the time point t4 to the time point t5, the setting of the limit vehicle velocity VL is changed by the limit travel control unit 30c from the maximum velocity Vmax determined by the non-limit travel control unit 30a to the limit vehicle velocity Vn. When assistance by the high voltage battery 14 is started, the SOC of the high voltage battery 14 becomes lower than SOCm (SOC<SOCm), and the SOC is decreased gradually.

Then, during the control of repeating step S6→step S1: NO→step S2: YES→step S6 . . . , under the control of the limit travel control unit 30c, the output of the fuel cell stack 34 is limited. However, electrical energy to make up for the shortage of electrical energy for maintaining the limit velocity Vn is assisted for the motor 24 (the electrical energy is supplied to the motor 24) from the high voltage battery 14. Thus, the limit velocity VL reaches Vn (Vn (VL=Vn) to perform travel control.

At the time point t7 during this travel control, when the gas pressure P is decreased to the third threshold pressure P3 corresponding to the out-of-gas tank pressure (step S1: YES), in step S7, the interruption valve 84 is closed, and power generation of the fuel cell stack 34 is stopped.

By performing the control as described above, during the time period between the time point t4 and the time point t7, in the case where the gas pressure of the permeable gas stored in the space between the resin liner and the CFRP layer is higher than the gas pressure in the high pressure tank 80, a small amount of the permeable gas is released from a channel of a vent line, and deformation of the resin liner is prevented. After the time point t7, the gas pressure of the permeable gas does not become higher than the out-of-gas tank pressure P3 in the high pressure tank 80, and the occurrence of buckling is prevented. As a result, deformation of the resin liner is prevented.

In this manner, at the same time, sine the fuel remaining in the high pressure tank 80 can be used up as effectively as possible, improvement in the commodity quality of the fuel cell vehicle 10 is achieved.

In this case, in step S7, and from the time t7, until the state of charge of the high voltage battery 14 becomes SOCmin (SOC=SOCmin) in determination of step S8 (step S8: YES), by the sequence of S8: NO→step S1: YES→step S7→step S8: NO . . . , it is possible to continue so called the EV travel.

As described above, in the embodiment of the present invention, it is possible to prevent deformation of the resin liner due to the occurrence of buckling, and moreover, it is possible to use up the hydrogen gas stored in the high pressure tank 80 until so called the out-of-gas state. Further, it is possible to suppress the rapid decrease of the power of the fuel cell vehicle 10, and maintain the requisite minimum travel performance. Accordingly, improvement in the commodity quality of the fuel cell vehicle 10 is achieved.

The following modifications of the embodiment may be made. In the first to third modified embodiments as described below, the constituent elements that have the same structure as those of the above embodiment are labelled with the same reference numerals, and only the constituent elements having different structure will be described.

[First Modified Embodiment] (Abnormal Situation Handling Control of the Thermometer 104c)

FIG. 5 is a flow chart used for explaining a method of controlling a fuel cell vehicle according to a first modified embodiment. The fuel cell vehicle may have the same structure as that of the fuel cell vehicle 10 shown in FIG. 1.

The flow chart of FIG. 5 is different from the flow chart of FIG. 3 only in that a thermometer monitoring step of monitoring the presence/absence of abnormality of the thermometer 104c is inserted into step S1A.

In this step S1A, in the case where the thermometer 104c for measuring the gas temperature T in the high pressure tank 80 detects abnormality, e.g., there is no change over time, even though the fuel cell vehicle 10 is in the middle of traveling, in step S6, the output limit process of the fuel cell stack 34 (FC) and the assist process from the high voltage battery 14 is started.

The assist process in this step S6 is performed in the charge period ta in FIG. 4, from the time point t4 to the time point t7 of reaching the out-of-gas state, in correspondence with the charge period until abnormality of the thermometer 104c is detected (step S1A: YES) (the charge period ta may be insufficient). It should be noted that, in the process in the initial step S1A, normally, the condition is not satisfied (step S1A: NO).

In this first modified embodiment, the thermometer monitoring unit 30d detects the presence/absence of abnormality in the thermometer 104c for measuring the gas temperature T in the high pressure tank 80 (temperature measuring unit monitoring step).

During the non-limit travel control by the non-limit travel control unit 30a from the time point t1, in the case where the presence/absence of abnormality is detected, when abnormality of the thermometer 104c is detected, the limit travel control unit 30c limits the vehicle velocity VL to Vn (VL=Vn), to limit the amount of fuel released from the high pressure tank 80 (limit travel step). It should be noted that, when abnormality is detected, as shown in FIG. 4, as indicated by the time point t4, the release rate from the high pressure tank 80 is limited.

Then, the limit travel control unit 30c provides assistance using the electrical energy of the high voltage battery 14 in a manner that the travel driving force by the motor 24 becomes the travel driving force of the required limit (limit vehicle velocity VL=Vn.

It should be noted that, since spare charging of the high voltage battery 14 is started in the case where the abnormality of the thermometer 104c is detected from the time point t2, detection of the abnormality of the thermometer 104c may be performed between step S2 and step S3.

[Second Modified Embodiment] (Travel Control Based on the Gas Temperature T)

(i) Problems to be Solved in the Second Modified Embodiment

Figure 6A:
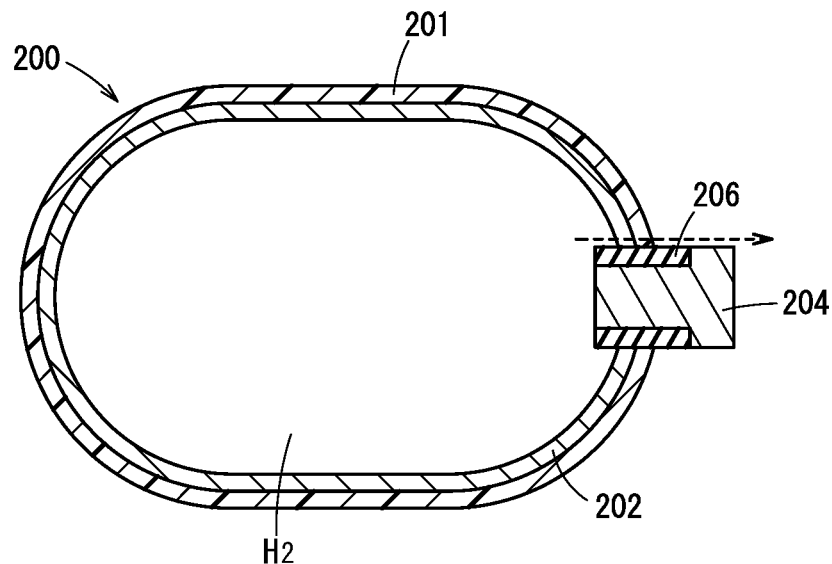
FIG. 6A is a view used for explaining problems to be solved by a second modified embodiment.
Figure 6B:
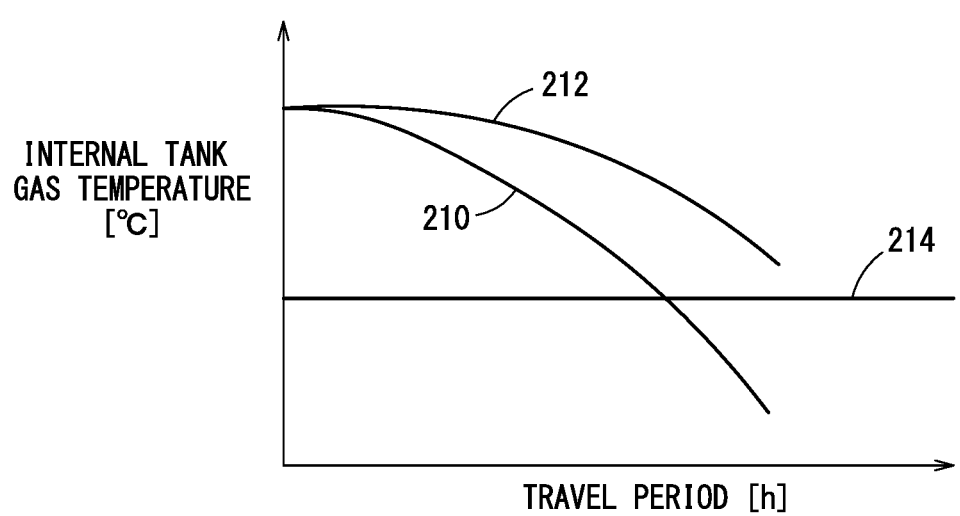
FIG. 6B is a graph used for explaining the problems to be solved by the second modified embodiment.

FIGS. 6A and 6B are views used for explaining problems to be solved by the second modified embodiment.

In a high pressure tank (also referred to as the hydrogen tank) 200 shown in FIG. 6A, due to the difference in structure, the proportions of the heat exchanged between the internal gas of the hydrogen tank and the outside are different. A tank of the metal liner includes a CFRP layer 201 and a liner 202 made of metal inside the CFRP layer 201. Since the heat can be transmitted easily between the tank and the outside of the tank, the temperature change is slow, and it is possible to suppress strength of the output limit.

In the meanwhile, in the case of the tank where the liner 202 is a resin liner (e.g., the high pressure tank 80 in the embodiment), since the heat cannot be transmitted easily between the tank and the outside of the tank, the output limit needs to be strong, and it is required to significantly limit the hydrogen supply amount.

As shown in FIG. 6B, at the time of traveling (hydrogen consumption), as the gas pressure P decreases, the temperature in the high pressure tank 200 is decreased due to heat insulating expansion. The decrease in a temperature decrease characteristic curve 210 of the high pressure tank 200 of the resin liner is larger than the decrease in a temperature decrease characteristic curve 212 of the high pressure tank 200 of the metal liner.

As shown in FIG. 6A, the hydrogen gas is held hermetically by a seal member 206 provided at the root of a cap 204. However, when the temperature of the hydrogen gas becomes low, the seal performance cannot be guaranteed. In this case, on the temperature decrease characteristic curve 210, when the internal tank gas temperature of the resin liner of the high pressure tank 200 (high pressure tank 80) is decreased below a seal lower limit temperature 214 (FIG. 6B), as shown by an arrow of a broken line in FIG. 6A, there is a concern that leakage of the fuel gas from the tank may occur.

In order to prevent such a situation, in the conventional fuel cell vehicle, when the gas temperature is low, the output is limited and/or the supply of hydrogen is stopped (the vehicle is stopped). Therefore, in particular, under the low temperature environment, it becomes no longer possible for the fuel cell vehicle to travel at high speed continuously.

(ii) Structure and Operation of the Second Modified Embodiment

A method of controlling a fuel cell vehicle according to the second modified embedment, for solving the problem, can be performed by the fuel cell vehicle 10A which is similar to the fuel cell vehicle 10 according to the embodiment shown in FIG. 1. It should be noted that the fuel cell vehicle 10A is different from the fuel cell vehicle 10 in that the thermometer monitoring unit 30d depicted above is provided.

Operation of a fuel cell vehicle 10A for performing a method of controlling a fuel cell vehicle according to the second modified embodiment will be described with reference to a time chart shown in FIG. 7, and the time chart shown in FIG. 4 as necessary.

Figure 7:
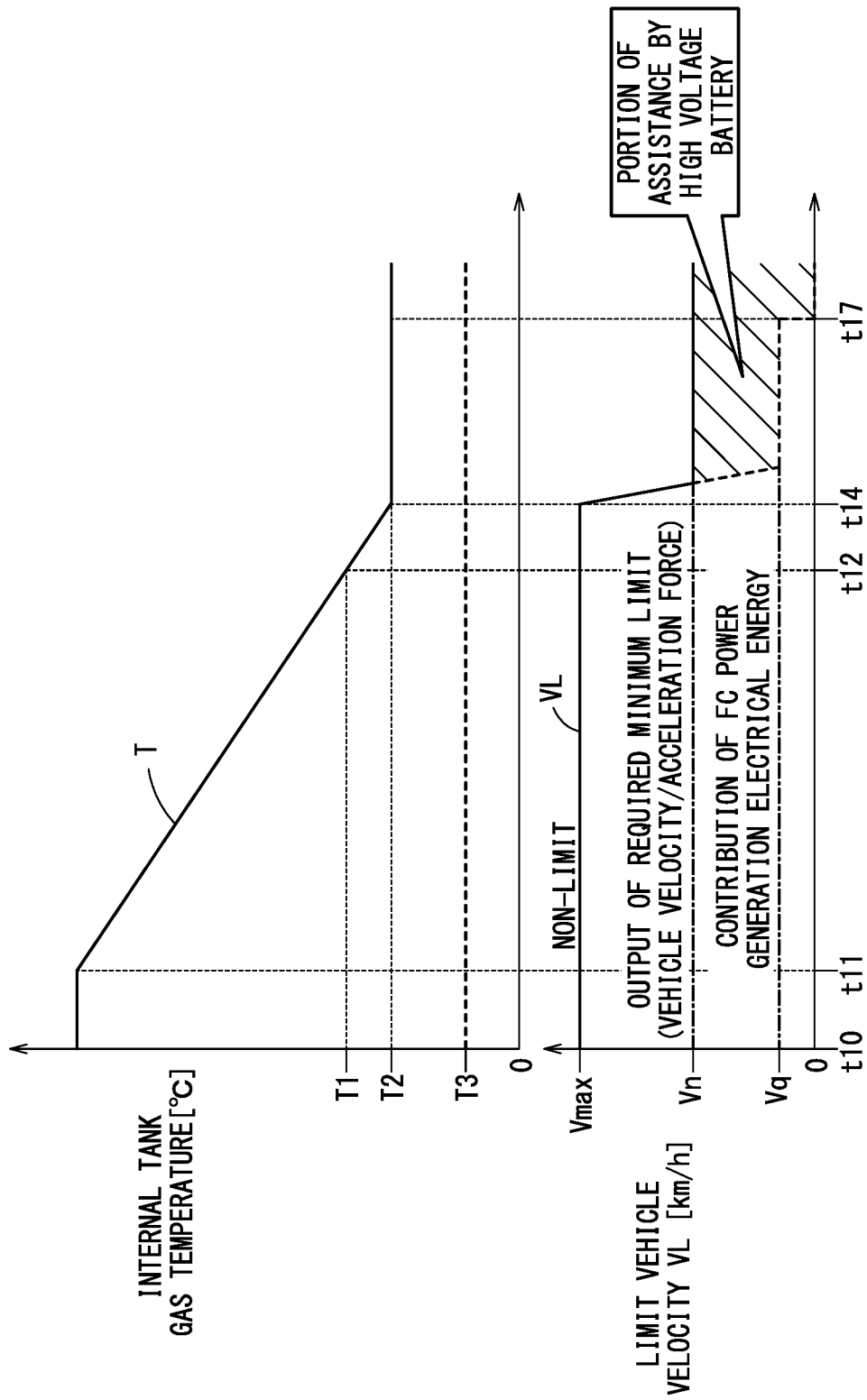
FIG. 7 is a time chart used for explaining operation of the fuel cell vehicle according to the second modified embodiment.

From the time point t11 in FIG. 7 (corresponding to the time point t1 in FIG. 4) the fuel cell vehicle 10A starts to travel under control of non-limit travel control unit 30a, and when the internal tank gas temperature T measured by the thermometer 104c is decreased to the first threshold temperature T1, the SOC increase control unit 30b positively charges the electrical energy generated in the fuel cell stack 34 in the high voltage battery 14, and increases the SOC which is the charge amount to the margin SOCm (see FIG. 4), and maintains the SOC at the margin SOCm.

The margin SOCm is an amount of electrical energy at which the gas decrease rate is limited to make it possible to maintain the operation until the gas pressure of the high pressure tank 80 reaches the third threshold value P3 (see FIG. 4) which is considered to be the out-of-gas pressure.

At the time point t14 where the gas temperature T is decreased to the second threshold temperature T2 which is the output limit start temperature, the limit travel control unit 30c sets the limit vehicle velocity VL to Vn (VL=Vn) where the required minim output (vehicle velocity/acceleration) of the fuel cell vehicle 10 is reliably obtained.

From the time t14, the output limit amount of the fuel cell stack 34 is assisted by the electrical energy of the high voltage battery 14, in a manner that the fuel cell vehicle 10 can travel at the limit vehicle velocity VL of Vn (VL=Vn) (e.g., velocity where the fuel cell vehicle 10 can maintain the minimum travel velocity in a highway). It should be noted that the contribution of the electrical energy generated in power generation of the fuel cell stack 34 from the time t14 is in the range of 0 to the limit vehicle velocity Vq (see FIG. 7).

Thus, in the fuel cell vehicle 10A according to the second modified embodiment, the gas temperature T of the high pressure tank 80 is monitored through the thermometer 104c by the thermometer monitoring unit 30d.

When the gas temperature T of the high pressure tank 80 is decreased to a first threshold temperature T1 as a predetermined value, the power generation amount of the fuel cell stack 34 is increased, and a redundant portion of the electrical energy is charged in the high voltage battery 14 (the time point t12 to the time point t14).

The electrical energy is charged in the high voltage battery 14 as much as possible, preferably, up to the margin SOCm, before the time point t14 at which the internal tank gas pressure T is decreased to the second threshold temperature T2 and the output limit is started due to the low pressure of the high pressure tank.

At the time point t14, subsequently, when the output limit of the fuel cell stack 34 is started, assistance is provided using electrical energy stored in the high voltage battery 14 to make up for the shortage of the electrical energy generated the power generation of the fuel cell stack 34.

By performing the control in this manner, the gas temperature T in the high pressure tank 80 does not decrease the tank guarantee temperature T3 (FIG. 7) set in correspondence with the seal lower limit temperature 214 of FIG. 6B, and the concern of the leakage of the fuel gas from the inside of the high pressure tank 80 at low temperature is eliminated.

Third Modified Embodiment

Figure 8:
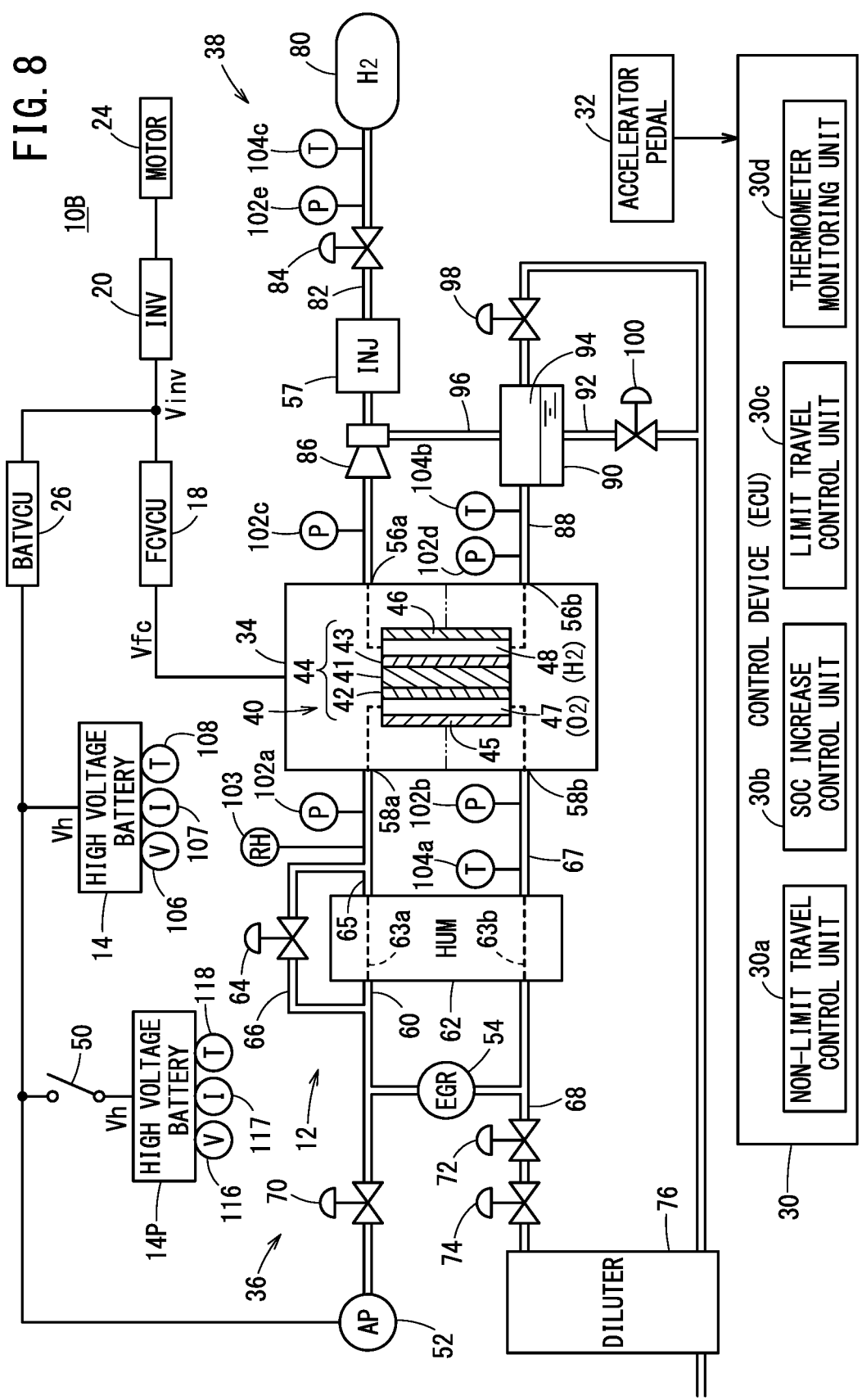
FIG. 8 is a diagram showing an example of structure of a fuel cell vehicle according to a third modified embodiment.

FIG. 8 is a block diagram showing an example of structure of a fuel cell vehicle 10B according to a third modified embodiment.

The fuel cell vehicle 10B is different from the fuel cell vehicle 10 which has been described with reference to FIG. 1 in that a spare high voltage battery 14P is provided in parallel with the high voltage battery 14 for normal use, through a switch 50.

The SOC of the spare high voltage battery 14P is obtained based on the detection voltage by a voltmeter 116, the detection current by an ammeter 117, and the detection temperature by a thermometer 118.

In the structure, in FIG. 4, during the period between the time point t2 and the time point t4, electrical energy is charged in the spare high voltage battery 14P instead of charging the electrical energy in the normal high voltage battery 14.

In this case, for example, from the time point t4, the fully charged spare high voltage battery 14P assists the power generation electrical energy of the fuel cell stack 34. After the electrical energy of the spare high voltage battery 14P is used up, the SOC is controlled to provide assistance of the electrical energy generated in power generation using the normal high voltage battery 14 where the SOC is SOCr (SOC=SOCr).

Fourth Modified Embodiment

In the embodiment described above with reference to FIG. 4, during the period between the time point t0 and the time point t2, the SOC of the high voltage battery 14 is set to the required SOCr to perform charge/discharge control.

However, the present invention is not limited in this respect. During the period between the time point t0 and the time point t4, the SOC of the high voltage battery 14 may be controlled to the margin SOCm. In this manner, it is possible to omit spare charging to prepare for providing assistance during the period between the time point t2 and the time point t3.

In the fourth modified embodiment, as shown in the flow chart in FIG. 9, steps S3 and S5 in the flow chart in FIG. 3 can be omitted, and the process of step S4 can be changed to the process of step S4'. In this manner, without limiting the output of the fuel cell stack 34, by operating the accelerator pedal 32, it is possible to allow the fuel cell vehicle 10 to continue to travel, and/or travel reliably where the limit vehicle VL can be increased to the maximum vehicle velocity Vmax.

[Invention Understood from the Embodiment and the Modified Embodiments]

Hereinafter, the invention which can be understood from the above embodiment, and the first, the second, and fourth modified embodiments will be described below. For the purpose of brevity, though constituent elements are labelled with some of reference numerals used in the above description, these constituent elements are not limited to those labelled with such reference numerals.

As described, e.g., with reference to FIGS. 1 and 9 and in the fourth embodiment, in the method of controlling the fuel cell vehicle 10 according the present invention, the fuel cell vehicle 10 is equipped with the high pressure tank 80 configured to store a fuel gas, the fuel cell 34 configured to perform power generation by electrochemical reactions of the fuel gas and an oxygen-containing gas, the chargeable/dischargeable energy storage device 14, and the motor 24 configured to generate a travel driving force by at least one of electrical energy of the fuel cell 34 and electrical energy of the energy storage device 14. The method includes the gas pressure measuring step of measuring a gas pressure P in the high pressure tank 80 (steps S1 and S2), the non-limit travel step of, during a period in which the gas pressure P changes from a full charge pressure Pfull to an output limit start threshold pressure P2, allowing the fuel cell vehicle 10 to travel, without limiting the travel driving force by the motor 24 mainly using the electrical energy of the fuel cell 34 (in FIG. 9, step S4'), the limit travel step of, when the gas pressure P becomes the output limit start threshold pressure P2, allowing the fuel cell vehicle 10 to travel while limiting an amount of fuel released from the high pressure tank 80 and limiting the travel driving force by the motor 24 to a required limit (in FIG. 9, step S6), wherein, in the limit travel step, assistance is provided using the electrical energy of the energy storage device 14 in a manner that the travel driving force by the motor 24 becomes the travel driving force of the required limit.

In this system, when the gas pressure P in the high pressure tank 80 becomes the output limit start threshold pressure P2, the amount of fuel released from the high pressure tank 80 is limited to prevent the occurrence of buckling, deformation of the resin liner of the high pressure tank 80 is prevented, and the travel driving force by the motor 24 is limited to the required limit. At the time of limitation, assistance is provided using the electrical energy of the energy storage device 14 in a manner that the travel driving force by the motor 24 becomes the travel driving force of the required limit. Therefore, even in the case where the fuel amount is limited to prevent the occurrence of buckling, it is possible to prevent rapid decrease in the travel driving force by the motor 24 of the fuel cell vehicle 10. In this manner, it is possible to improve the commodity quality of the fuel cell vehicle 10.

In this regard, the method may further include the gas interruption travel step of, when the gas pressure P becomes an out-of-gas tank pressure P3 which is less than the output limit start threshold value pressure P2 in the limit travel step, interrupting release of a gas from the high pressure tank 80 to generate the travel driving force by the motor 24 only using the electrical energy of the energy storage device 14.

In this case, it is possible to enable the fuel cell vehicle 10 to travel using the electrical energy of the energy storage device 14 while interrupting the discharge of the gas from the high pressure tank 80 and the occurrence of buckling in the high pressure tank 80.

As described in the embodiment with reference to FIGS. 1, 3, and 4, in the method of controlling the fuel cell vehicle 10 according to the present invention, the fuel cell vehicle 10 is equipped with the high pressure tank 80 configured to store a fuel gas, the fuel cell 34 configured to perform power generation by electrochemical reactions of the fuel gas and an oxygen-containing gas, the chargeable/dischargeable energy storage device 14, and the motor 24 configured to generate a travel driving force by at least one of electrical energy of the fuel cell 34 and electrical energy of the energy storage device 14. The method includes the gas pressure measuring step of measuring a gas pressure P in the high pressure tank 80 (steps S1, S2, and S3), the non-limit travel step of, during a period in which the gas pressure P changes from a full charge pressure Pfull to the first threshold pressure P1, allowing the fuel cell vehicle 10 to travel without limiting the travel driving force by the motor 24 mainly using the electrical energy of the fuel cell 34 (the time point t0 to the time point t4), and the SOC increase travel step of, when the gas pressure P becomes less than the first threshold pressure P1, extra charging a partial amount of electrical energy generated in power generation of the fuel cell 34, in the energy storage device 14 to increase the SOC of the energy storage device 14 up to the margin SOC (SOCm) (step S5, the time point t2 to the time point t4), the limit travel step of, when the gas pressure P becomes the second threshold pressure P2 which is less than the first threshold pressure P1, allowing the fuel cell vehicle 10 to travel while limiting an amount of fuel released from the high pressure tank 80 and limiting the travel driving force by the motor 24 to a required limit (step S6, from the time point t4), wherein, in the limit travel step, assistance is provided using the electrical energy of the energy storage device 14 in a manner that the travel driving force by the motor 24 becomes the travel driving force of the required limit.

In this system, when the gas pressure P in the high pressure tank 80 becomes less than the first threshold pressure P1, the SOC of the energy storage device 14 is increased to the margin SOC (SOCm), and when the gas pressure P becomes the second threshold pressure P2 which is less than the first threshold pressure P1, the amount of fuel released from the high pressure tank 80 is limited to prevent the occurrence of buckling, deformation of the resin liner of the high pressure tank 80 is prevented, and the travel driving force by the motor 24 is limited to the required limit. At the time of limitation, assistance is provided in a manner that the travel driving force by the motor 24 becomes the travel driving force of the required limit by the electrical energy of the energy storage device 14. Therefore, even if the fuel amount is limited for preventing the occurrence of buckling, it is possible to prevent rapid decrease in the travel driving force by the motor 24 of the fuel cell vehicle 10. In this manner, it is possible to improve the commodity quality of the fuel cell vehicle 10.

Further, in the non-limit travel step (the time point t0 to the time point t4), charge/discharge control of the SOC of the energy storage device 14 may be performed in a manner that the SOC of the energy storage device 14 becomes a required SOC (SOCr) having a substantially constant value which is not more than the margin SOC (SOCm), and the entire regenerative electrical energy of the motor 24 is allowed to be stored in the energy storage device 14.

In this system, charge/discharge control of the SOC of the energy storage device 14 is performed in a manner that the SOC of the energy storage device 14 becomes a required SOC (SOCr) having a substantially constant value, and the entire regenerative electrical energy of the motor 24 can be stored in the energy storage device 14. In this manner, at the time of acceleration, the electrical energy of the fuel cell 34 can be assisted by the electrical energy of the energy storage device 14. At the time of deceleration, the regenerative electrical energy of the motor 24 can be collected (charged) in the energy storage device 14 without any waste.

Further, the method further includes the gas interruption travel step (from the time point t7) of, when the gas pressure P becomes a third threshold pressure P3 which is less than the second threshold pressure P2, interrupting release of a gas from the high pressure tank 80, and generating the travel driving force by the motor 24 using only the electrical energy of the energy storage device 14.

In the structure, it is possible to allow the fuel cell vehicle 10 to travel using the electrical energy of the energy storage device 14, while interrupting release of the gas from the high pressure tank 80, and preventing the occurrence of buckling in the high pressure tank 80.

Furthermore, preferably, the SOC increase travel step is completed before starting the limit travel step (step S6, from the time point t4).

In this case, it is possible to reliably obtain the target assist amount.

For example, as described with reference to FIGS. 1 and 5 in the first modified embodiment, in the method of controlling the fuel cell vehicle 10 according to the present invention, the fuel cell vehicle 10 is equipped with the high pressure tank 80 configured to store a fuel gas, the fuel cell 34 configured to perform power generation by electrochemical reactions of the fuel gas and an oxygen-containing gas, the chargeable/dischargeable energy storage device 14, the motor 24 configured to generate a travel driving force by at least one of electrical energy of the fuel cell 34 and electrical energy of the energy storage device 14, the temperature measuring unit 104c configured to measure a gas temperature T in the high pressure tank 80, and the gas pressure measuring unit 102e configured to measure a gas pressure P in the high pressure tank 80. The method includes the temperature measuring unit monitoring step of detecting the presence/absence of abnormality in the temperature measuring unit 104c configured to measure the gas temperature T in the high pressure tank 80 (step S1A) and the limit travel step of, when there is abnormality in the temperature measuring unit 104c, allowing the fuel cell vehicle 10 to travel while limiting the amount of the fuel released from the high pressure tank 80 and limiting the travel driving force by the motor 24 to a required limit (step S6, from the time point t4), wherein, in the limit travel step (step S6, from the time point t4), assistance is provided using the electrical energy of the energy storage device 14 in a manner that the travel driving force by the motor 24 becomes the travel driving force of the required limit.

In this system, when there is abnormality in the temperature measuring unit 104c, the amount of the fuel released from the high pressure tank 80 is limited, and the travel driving force by the motor 24 is limited to the required limit. At this time, since the travel driving force by the motor 24 is controlled to the travel driving force of the required limit using the electrical energy of the energy storage device 14, It is possible to allow the fuel cell vehicle 10 to travel while preventing stop of the fuel cell vehicle 10. In this manner, it is possible to improve the commodity quality of the fuel cell vehicle 10.

For example, as described in the second modified embodiment with reference FIGS. 1 and 7, in the method of controlling the fuel cell vehicle 10 according to the present invention, the fuel cell vehicle 10 is equipped with the high pressure tank 80 configured to store a fuel gas, the fuel cell 34 configured to perform power generation by electrochemical reactions of the fuel gas and an oxygen-containing gas, the chargeable/dischargeable energy storage device 14, and the motor 24 configured to generate a travel driving force by at least one of electrical energy of the fuel cell 34 and electrical energy of the energy storage device 14. The method includes the gas temperature/gas pressure measuring step of measuring a gas temperature T and a gas pressure P in the high pressure tank 80 (the time point t10 to the time point t17), the SOC increase travel step of, when the gas temperature T becomes less than a first threshold temperature T1, charging a partial amount of electrical energy generated in power generation by the fuel cell 34, in the energy storage device 14 to increase the SOC of the energy storage device 14 up to a margin SOC (SOCm) (the time point t12 to the time point t14), the non-limit travel step of, until the gas temperature T becomes the second threshold temperature T2 which is lower than the first threshold temperature T1, allowing the fuel cell vehicle 10 to travel mainly using the electrical energy of the fuel cell 34 without limiting the travel driving force by the motor 24 (the time point t11 to the time point t14), and the limit travel step of, when the gas temperature T becomes the second threshold temperature T2, allowing the fuel cell vehicle 10 to travel while limiting the amount of fuel released from the high pressure tank 80, and limiting the travel driving force by the motor 24 to a required limit (the time point t14 to the time point t17), wherein, in the limit travel step (the time point t14 to the time point t17), assistance is provided using the electrical energy of the energy storage device 14 in a manner that the travel driving force by the motor 24 becomes the travel driving force of the required limit.

In this system, when the gas temperature T in the high pressure tank 80 becomes less than a first threshold temperature T1, the SOC of the energy storage device 14 is increased to the margin SOC (SOCm), and when the gas temperature T becomes the second threshold temperature T2 which is lower than the first threshold temperature T1, the amount of fuel released from the high pressure tank 80 is limited, and the travel driving force by the motor 24 is limited to the required limit. Then, the electrical energy of the energy storage device 14 is used to provide assistance in a manner that the travel driving force by the motor 24 becomes the travel driving force of the required limit. In this manner, even if the fuel amount is limited, it is possible to prevent rapid decrease in the travel driving force by the motor 24 of the fuel cell vehicle 10.

For example, as described in the fourth modified embodiment with reference to FIGS. 1 and 9, the fuel cell vehicle 10 according to the present invention includes the high pressure tank 80 configured to store a fuel gas, the fuel cell 34 configured to perform power generation by electrochemical reactions of the fuel gas and an oxygen-containing gas, the chargeable/dischargeable energy storage device 14, the motor 24 configured to generate a travel driving force by at least one of electrical energy of the fuel cell 34 and electrical energy of the energy storage device 14, the control device 30, the gas pressure measuring unit 102e configured to measure a gas pressure P in the high pressure tank 80, the non-limit travel control unit 30a configured to, during a period in which the gas pressure P changes from the full charge pressure Pfull to the output limit start threshold pressure P2, allowing the fuel cell vehicle 10 to travel without limiting the travel driving force by the motor 24 mainly using the electrical energy of the fuel cell 34, and the limit travel control unit 30c configured to, when the gas pressure P becomes the output limit start threshold pressure P2, allow the fuel cell vehicle 10 to travel while limiting an amount of fuel released from the high pressure tank 80 and limiting the travel driving force by the motor 24 to a required limit, wherein the limit travel control unit 30c is configured to provide assistance using the electrical energy of the energy storage device 14 in a manner that the travel driving force by the motor 24 becomes the travel driving force of the required limit.

In this system, when the gas pressure P in the high pressure tank 80 becomes the output limit start threshold pressure P2, the amount of fuel released from the high pressure tank 80 is limited to prevent the occurrence of buckling in the high pressure tank 80, and the travel driving force is limited to the required limit. Then, the electrical energy of the energy storage device 14 is used to provide assistance in a manner that the travel driving force by the motor 24 becomes the travel driving force of the required limit. Therefore, even if the fuel amount is limited to prevent the occurrence of buckling in the high pressure tank 80, it is possible to prevent rapid decrease of the travel driving force of the fuel cell vehicle 10. In this manner, it is possible to improve the commodity quality of the fuel cell vehicle 10.

The preset invention is not limited to the above embodiments. It is a matter of course that various structures can be adopted based on the description of the specification.

What is claimed is:

1. A method of controlling a fuel cell vehicle, the fuel cell vehicle being equipped with:
   a pressure tank including a resin liner and storing a fuel gas;
   a fuel cell performing power generation by electrochemical reactions of the fuel gas and an oxygen-containing gas;
   a chargeable/dischargeable energy storage device; and
   a motor generating a travel driving force by at least one of electrical energy of the fuel cell and electrical energy of the energy storage device,
   the method comprising:
      measuring a gas pressure in the pressure tank;
      during a period in which the gas pressure changes from a full charge pressure to an output limit start threshold pressure, allowing the fuel cell vehicle to travel, without limiting the travel driving force by the motor mainly using the electrical energy of the fuel cell; and
      when the gas pressure becomes the output limit start threshold pressure, allowing the fuel cell vehicle to travel while limiting an amount of fuel released from the pressure tank and limiting the travel driving force by the motor to a required limit,
   wherein the output limit start threshold pressure is set to a threshold pressure for preventing deformation due to an occurrence of buckling of the resin liner of the pressure tank by reducing a change in a pressure of the fuel gas released from the pressure tank to the fuel cell stack over time to start limiting the amount of the fuel released from the pressure tank to the fuel cell stack, and
   wherein, in the allowing the fuel cell vehicle to travel while limiting the travel driving force, assistance is provided using the electrical energy of the energy storage device in a manner that the travel driving force by the motor becomes the travel driving force of the required limit.

2. The method of controlling the fuel cell vehicle according to claim 1, in the allowing the fuel cell vehicle to travel while limiting the travel driving force, when the gas pressure becomes an out-of-gas tank pressure which is less than the output limit start threshold value pressure, interrupting release of a gas from the pressure tank to generate the travel driving force by the motor only using the electrical energy of the energy storage device.

3. A method of controlling a fuel cell vehicle, the fuel cell vehicle being equipped with:
   a pressure tank including a resin liner and storing a fuel gas;
   a fuel cell performing power generation by electrochemical reactions of the fuel gas and an oxygen-containing gas;
   a chargeable/dischargeable energy storage device; and
   a motor generating a travel driving force by at least one of electrical energy of the fuel cell and electrical energy of the energy storage device;
   the method comprising:
      measuring a gas pressure in the pressure tank;
      during a period in which the gas pressure changes from a full charge pressure to a first threshold pressure, allowing the fuel cell vehicle to travel without limiting the travel driving force by the motor mainly using the electrical energy of the fuel cell;
      when the gas pressure becomes less than the first threshold pressure, extra charging a partial amount of electrical energy generated in power generation of the fuel cell, in the energy storage device to increase the SOC of the energy storage device up to a margin SOC; and
      when the gas pressure becomes a second threshold pressure which is less than the first threshold pressure, allowing the fuel cell vehicle to travel while limiting an amount of fuel released from the pressure tank and limiting the travel driving force by the motor to a required limit,
   wherein the second threshold pressure is set to a threshold pressure for preventing deformation due to an occurrence of buckling of the resin liner of the pressure tank by reducing a change in a pressure of the fuel gas released from the pressure tank to the fuel cell stack over time to start limiting the amount of the fuel released from the pressure tank to the fuel cell stack, and
   wherein, in the allowing the fuel cell vehicle to travel while limiting the travel driving force, assistance is provided using the electrical energy of the energy storage device in a manner that the travel driving force by the motor becomes the travel driving force of the required limit.

4. The method of controlling the fuel cell vehicle according to claim 3, wherein in the allowing the fuel cell vehicle to travel without limiting the travel driving force, charge/discharge control of the SOC of the energy storage device is performed in a manner that the SOC of the energy storage device becomes a required SOC having a substantially constant value which is not more than the margin SOC, and entire regenerative electrical energy of the motor is allowed to be stored in the energy storage device.

5. The method of controlling the fuel cell vehicle according to claim 3, in the allowing the fuel cell vehicle to travel while limiting the travel driving force, when the gas pressure becomes a third threshold pressure which is less than the second threshold pressure, interrupting release of a gas from the pressure tank, and generating the travel driving force by the motor using only the electrical energy of the energy storage device.

6. The method of controlling the fuel cell vehicle according to claim 3, wherein the increase in the SOC of the energy storage device up to the margin SOC is completed before starting the limit travel step.

7. A method of controlling a fuel cell vehicle, the fuel cell vehicle being equipped with:
a pressure tank including a resin liner and a seal member provided at a root of a cap of the pressure tank, the pressure tank storing a fuel gas;
a fuel cell performing power generation by electrochemical reactions of the fuel gas and an oxygen-containing gas;
a chargeable/dischargeable energy storage device;
a motor generating a travel driving force by at least one of electrical energy of the fuel cell and electrical energy of the energy storage device;
a temperature measuring unit measuring a gas temperature in the pressure tank; and
a gas pressure measuring unit measuring a gas pressure in the pressure tank,
the method comprising:
detecting presence/absence of abnormality in the temperature measuring unit measuring the gas temperature in the pressure tank, the abnormality being no change in the gas temperature over a length of time in which the fuel cell vehicle has been traveling; and
when there is abnormality in the temperature measuring unit, allowing the fuel cell vehicle to travel while limiting an amount of the fuel released from the pressure tank and limiting the travel driving force by the motor to a required limit,
wherein, in the allowing the fuel cell vehicle to travel while limiting the travel driving force, assistance is provided using the electrical energy of the energy storage device in a manner that the travel driving force by the motor becomes the travel driving force of the required limit.

8. A method of controlling a fuel cell vehicle, the fuel cell vehicle being equipped with:
a pressure tank storing a fuel gas;
a fuel cell performing power generation by electrochemical reactions of the fuel gas and an oxygen-containing gas;
a chargeable/dischargeable energy storage device; and
a motor generating a travel driving force by at least one of electrical energy of the fuel cell and electrical energy of the energy storage device,
the method comprising:
measuring a gas temperature and a gas pressure in the pressure tank;
when the gas temperature becomes less than a first threshold temperature, charging a partial amount of electrical energy generated in power generation by the fuel cell, in the energy storage device to increase an SOC of the energy storage device up to a margin SOC;
until the gas temperature becomes a second threshold temperature which is lower than the first threshold temperature, allowing the fuel cell vehicle to travel mainly using the electrical energy of the fuel cell without limiting the travel driving force by the motor; and
when the gas temperature becomes the second threshold temperature, allowing the fuel cell vehicle to travel while limiting an amount of fuel released from the pressure tank, and limiting the travel driving force by the motor to a required limit,
wherein the second threshold temperature is set to a threshold temperature for preventing deformation due to an occurrence of buckling of the resin liner of the pressure tank by reducing a change in a pressure of the fuel gas released from the pressure tank to the fuel cell stack over time to start limiting the amount of the fuel released from the pressure tank to the fuel cell stack, and
wherein, in the allowing the fuel cell vehicle to travel while limiting the travel driving force, assistance is provided using the electrical energy of the energy storage device in a manner that the travel driving force by the motor becomes the travel driving force of the required limit.

9. A fuel cell vehicle comprising:
a pressure tank including a resin liner and storing a fuel gas;
a pressure gauge measuring a gas pressure in the pressure tank;
a fuel cell performing power generation by electrochemical reactions of the fuel gas and an oxygen-containing gas;
a chargeable/dischargeable energy storage device;
a motor generating a travel driving force by at least one of electrical energy of the fuel cell and electrical energy of the energy storage device; and
one or more processors,
wherein the one or more processors:
set the output limit start threshold pressure to a threshold pressure for preventing deformation due to an occurrence of buckling of the resin liner of the pressure tank by reducing a change in a pressure of the fuel gas released from the pressure tank to the fuel cell stack over time to start limiting an amount of the fuel released from the pressure tank to the fuel cell stack;
during a period in which the gas pressure changes from a full charge pressure to an output limit start threshold pressure, allow the fuel cell vehicle to travel, without limiting the travel driving force by the motor mainly using the electrical energy of the fuel cell;
when the gas pressure becomes the output limit start threshold pressure, allow the fuel cell vehicle to travel while limiting the amount of fuel released from the pressure tank and limiting the travel driving force by the motor to a required limit; and provide assistance using the electrical energy of the energy storage device in a manner that the travel driving force by the motor becomes the travel driving force of the required limit.

* * * * *